US012197586B2

(12) United States Patent
Bussell et al.

(10) Patent No.: US 12,197,586 B2
(45) Date of Patent: Jan. 14, 2025

(54) SYSTEMS AND PROCESSES FOR FACILITATING EDITS TO SOFTWARE BILL OF MATERIALS

(71) Applicant: MICROSOFT TECHNOLOGY LICENSING, LLC, Redmond, WA (US)

(72) Inventors: Frank Joseph Bussell, Issaquah, WA (US); Henry James Lyons, Seattle, WA (US); Nicholas Allan Schwerzler, Sammamish, WA (US); Sencer Nuri Yeralan, Seattle, WA (US); Dale Russel Rolf, Renton, WA (US); Minh Trong Tran, Bellevue, WA (US); David John Janson, Kirkland, WA (US); Thomas George Yaryan, Seattle, WA (US); Ian James McCarty, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 17/745,695

(22) Filed: May 16, 2022

(65) Prior Publication Data
US 2023/0367882 A1 Nov. 16, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......... G06F 21/12; G06F 21/16; G06F 21/57; G06F 21/572; G06F 21/577; G06F 2221/033
See application file for complete search history.

(56) References Cited

U.S. PATENT DOCUMENTS

| 6,202,070 | B1 | 3/2001 | Nguyen |
| 8,498,982 | B1 * | 7/2013 | Cope ...................... G06F 21/16 |
| | | | 707/694 |

(Continued)

OTHER PUBLICATIONS

The Software Package Data Exchange® (SPDX®) Specification Version 2.3 (Year: 2022).*

(Continued)

*Primary Examiner* — Boris D Grijalva Lobos
(74) *Attorney, Agent, or Firm* — Workman Nydegger

(57) ABSTRACT

Systems are provided for generating, modifying and using SBOMs for facilitating risk assessment and threat mitigation for corresponding programs, and particularly for large programming builds. The creation and modification of the SBOMs includes processes for omitting declarations referenced in chunk SBOMs of program chunks incorporated into a final programming build associated with a build SBOM, but which are not actually utilized by the final programming build, as well as processes for adding new declarations for code segments that are not declared in the related chunk SBOMs, even though the code segments are utilized by the final programming build. Systems are also configured to use SBOMs in combination with configuration restriction records to assess and resolve threat events in a manner that can prevent unnecessary remedial actions for threat events that appear to be relevant to one or more files or dependencies incorporated into a program.

20 Claims, 13 Drawing Sheets

(56) References Cited

U.S. PATENT DOCUMENTS

| | | | |
|---|---|---|---|
| 2015/0379262 A1 | 12/2015 | Islam | |
| 2016/0117160 A1 | 4/2016 | Parthasarathy | |
| 2016/0117161 A1* | 4/2016 | Parthasarathy | H04L 67/06 717/171 |
| 2018/0136941 A1 | 5/2018 | Kulick | |
| 2019/0018967 A1* | 1/2019 | Ramasamy | G06F 21/577 |
| 2019/0370471 A1 | 12/2019 | Petratos | |
| 2020/0201620 A1 | 6/2020 | Beard | |
| 2020/0389496 A1 | 12/2020 | Xuan | |
| 2021/0021644 A1 | 1/2021 | Crabtree | |
| 2022/0083652 A1 | 3/2022 | Ransford | |
| 2022/0398324 A1 | 12/2022 | Bosch | |
| 2023/0072264 A1 | 3/2023 | Coccia | |
| 2023/0208880 A1 | 6/2023 | Schutt | |
| 2023/0244791 A1 | 8/2023 | Jadhav | |
| 2023/0359744 A1 | 11/2023 | Duggan | |
| 2023/0367883 A1 | 11/2023 | Bussell | |

OTHER PUBLICATIONS

"SBOM at a Glance", Retrieved From: https://ntia.gov/sites/default/files/publications/sbom_at_a_glance_apr2021_0.pdf, Apr. 27, 2021, 3 Pages.

Haas, et al., "Is Static Analysis Able to Identify Unnecessary Source Code?", In Journal of ACM Transactions on Software Engineering and Methodology, vol. 29, Issue 1, Jan. 30, 2020, 23 Pages.

"International Search Report and Written Opinion Issued in PCT Application No. PCT/US23/015726", Mailed Date: Jun. 16, 2023, 11 Pages. (MS# 411132-WO-PCT).

Ponta, et al., "The Used, The Bloated, and The Vulnerable: Reducing The Attack Surface of an Industrial Application", In Proceedings of IEEE International Conference on Software Maintenance and Evolution, Sep. 27, 2021, pp. 555-558.

Vázquez, et al., "Slimming Javascript Applications: An Approach for removing unused Functions from Javascript Libraries", In Journal of Information and Software Technology, vol. 107, Mar. 2019, 18-29 pp.

"8 File information section", Retrieved from: https://spdx.github.io/spdx-spec/file-information/, Retrieved Date: Oct. 28, 2021, 17 Pages.

"Batch", Retrieved from: https://web.archive.org/web/20220310075028/https://azure.microsoft.com/en-us/services/batch/, Mar. 10, 2022, 12 pages.

"CBOR Object Signing and Encryption (COSE)", Retrieved from: https://www.iana.org/assignments/cose/cose.xhtml#header-parameters, Jan. 11, 2017, 15 Pages.

"The Software Package Data Exchange® (SPDX®) Specification Version 2.2.1", Retrieved from: https://spdx.github.io/spdx-spec/, Dec. 10, 2021, 1 Page.

Bormann, et al., "Concise Binary Object Representation (CBOR)", Retrieved from: https://datatracker.ietf.org/doc/rfc7049/, Oct. 2013, 46 Pages.

Hudek, et al., "DISM Overview", Retrieved from: https://docs.microsoft.com/en-us/windows-hardware/manufacture/desktop/what-is-dism?view=windows-11, Dec. 15, 2021, 4 Pages.

Schaad, J., "CBOR Object Signing and Encryption (COSE)", Retrieved from: https://www.rfc-editor.org/rfc/pdfrfc/rfc8152.txt.pdf, Jul. 2017, 121 Pages.

Schaad, Jim, "CBOR Object Signing and Encryption (COSE): Structures and Process", Retrieved from: https://datatracker.ietf.org/doc/draft-ietf-cose-rfc8152bis-struct/15/, Feb. 1, 2021, 59 Pages.

Steele, et al., "DID Specification Registries", Retrieved from: https://w3c.github.io/did-spec-registries/, Mar. 1, 2022, 46 Pages.

Non-Final Office Action mailed on Feb. 26, 2024, in U.S. Appl. No. 17/745,698, (MS# 411856-US01) 30 pages.

U.S. Appl. No. 17/745,689, filed May 16, 2022.

U.S. Appl. No. 17/745,698, filed May 16, 2022.

Final Office Action mailed on Sep. 6, 2024, in U.S. Appl. No. 17/745,698, 42 pages.

Non-Final Office Action mailed on Aug. 23, 2024, in U.S. Appl. No. 17/745,689, 17 pages.

\* cited by examiner

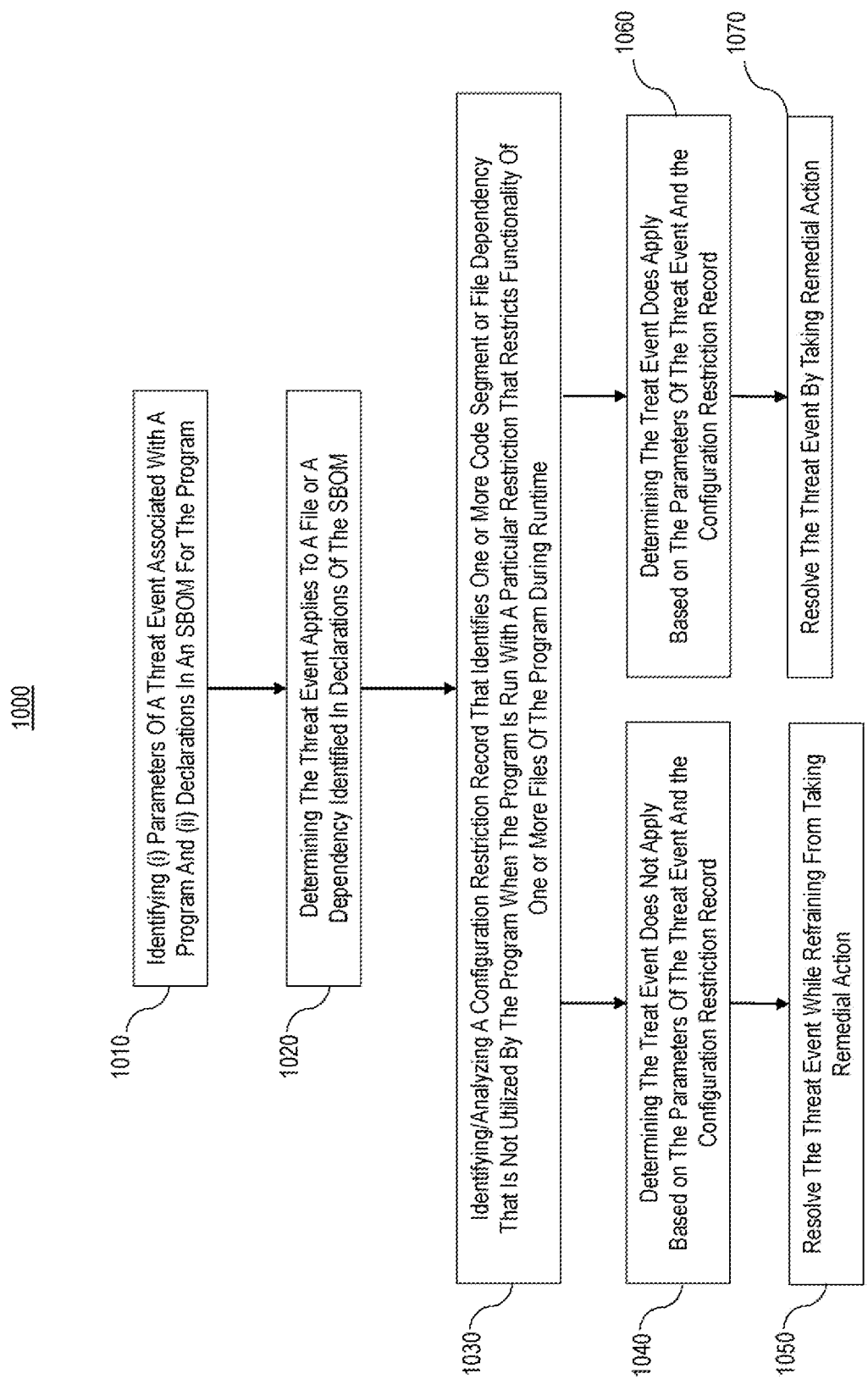

SYSTEMS AND PROCESSES FOR FACILITATING EDITS TO SOFTWARE BILL OF MATERIALS

BACKGROUND

The development and deployment of software by increasingly complex and distributed computing systems has necessitated ongoing improvements in cyber security. One such improvement includes the creation and use of a software bill of materials (SBOM).

A SBOM is a formalized record that includes declarations about purported software components that are integrated in or associated with a program, as well as the dependency and supply chain relationships of those components.

While conventional SBOMs are not presently configured to trigger threat mitigation on their own, they can be used as a reference tool for assessing a security profile associated with a corresponding software program. They can also be used as a guide for identifying program files that may be associated with known threats, and to thereby facilitate the triggering of remedial actions associated with those threats. For instance, when a new threat is discovered as being associated with a particular file (e.g., a compromised or vulnerable library file), it is possible to scan the SBOMs of different programs to see which of those programs likely contain the vulnerable file(s). Then, a user can delete, replace or otherwise modify the vulnerable file(s).

By using the SBOMs to identify program files that are likely to be exposed to known risks, it is possible to apply remedial actions to vulnerable programs and their compromised files, without having to waste resources performing remedial actions on unaffected programs that are determined to not contain the vulnerable files, selectively based on a review of the SBOMs associated with the unaffected programs.

In 2021, the United States Federal Government issued the executive order (Order No. 14028) addressing some of the underlying intentions for SBOMs. However, despite this order and corresponding guidance given by the National Telecommunications and Information Administration (NTIA), there is still a lot of flexibility and variability in how SBOMs are actually designed and applied. Accordingly, there are currently multiple different standards being created for specifying what types of declarations are made in a SBOM and how they are presented for identifying the files associated with a program, as well as how they are used to declare related dependencies and supply chain characteristics associated with the various components of a program. There is also great variability in the best practices associated with the timing for creating and updating the SBOMs during the development/deployment cycles.

Additionally, conventional systems are not currently configured to audit existing SBOMs, to verify whether all of the components declared by the SBOMs actually do exist within the corresponding program, and/or whether the declared SBOM components are actually capable of being utilized by the program, even if they do exist within a program. One reason for this is that a program may not install or utilize all of the files that are declared in a corresponding SBOM for that program, particularly when the SBOM is created during the program development cycle prior to compilation.

Furthermore, some programs can be modified during or after compilation and installation, so as to utilize additional files that are not specifically declared in the corresponding SBOM for that program. For at least these reasons, conventional systems cannot entirely rely on the declarations of an SBOM as representing an exact or exhaustive list of all components in a corresponding program. Accordingly, there continues to be an ongoing need and desire to improve the manner in which SBOMs are created and used.

For at least these reasons, it can sometimes be difficult to assess the relative and practical utility associated with using SBOMs that are developed with conventional technology to identify potential vulnerabilities of a program. This is particularly true for large distributed builds, in which the corresponding build SBOMs are typically overinclusive in terms of the declarations that are made by the build SBOM.

One reason for this is that the SBOM for a large build will often include all files of all underlying programs/program chunks, even though some of the files of those program chunks are not actually utilized by the large programming build. While the strategy for generating an SBOM based on the full contents of all underlying program chunks is largely successful in identifying most of the files and software components that could be contained in any particular build of a program, it can also result in the SBOM identifying many files and software components that are not actually included in or utilized by each of the different builds of the program, particularly when considering that a large programming build can sometimes be built from thousands of different combinations of files and software components.

It will be appreciated that a monolithic and overly inclusive SBOM for a large build, as just described, will have diminished functional utility for accurately assessing potential security risks posed to a program by newly discovered software threats. For instance, a conventional and overly inclusive SBOM that is associated with a large build may falsely identify the corresponding build as being vulnerable to a newly discovered software threat, based on a correlation between the software threat and a particular file that is identified in the SBOM, even though that particular file may not actually be incorporated within the final build configuration. In such instances, remedial actions may be triggered and corresponding time and computational resources will be wasted during the attempted mitigation of a risk for the program that does not actually exist.

It is also noted that it is also possible for conventional SBOMs, even large build SBOMs, to be underinclusive. In particular, it is common for developers to generate new code that is incorporated into a program by utilizing segments of code from existing files, and without necessarily incorporating or relying on the entirety of the existing files.

For instance, a developer might copy a particular software module that includes only a few lines of code, without copying the entire file that contains the copied module. In these instances, it is unlikely that the file containing the copied module will be declared in the SBOM for the new program, even though the program incorporates code copied from the file, and particularly if the developer has modified any portions of the copied code in anyway.

Consequently, this means that the resulting program that incorporates the copied code can still be at risk to software threats that target vulnerable portions of the copied code. This can create a false sense of security about a program, for example, when an examination of the corresponding program SBOM fails to identify any files that are known to be associated with new software threats that target the vulnerable portions of the copied code.

In view of the foregoing, there is an ongoing need and desire for systems and techniques for creating, updating and utilizing SBOMs to facilitate improved accuracy of the SBOMs and for using the SBOMs to perform risk analysis and threat mitigation, and particularly for programs that include large distributed builds.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, methods and devices for managing edits to an SBOM (software bill of materials).

These embodiments include processes for identifying a program and the SBOM corresponding to the program. The program includes a plurality of files and the SBOM for the program includes file declarations for at least some of the files incorporated into the program, as well as dependency declarations associated with one or more of the files.

After identifying the program, the program is parsed to identify a plurality of code segments contained in the plurality of files of the program. One or more repositories of open-source code are also searched for any undeclared code segments that are not referenced in the declarations of the SBOM, but which are determined to be within a predetermined threshold of similarity to one or more of the identified plurality of code segments contained in the plurality of files of the program.

Then, for at least one undeclared code segment determined to be within the predetermined threshold of similarity to the one or more identified plurality of code segments, a new declaration associated with the at least one undeclared code segment is generated for the SBOM to indicate at least author or source information for the undeclared code segments that is determined to be at least partially incorporated into the program.

Disclosed embodiments also include generating a modified SBOM for the program by adding the new declaration to the SBOM, either explicitly within the recited declarations of the SBOM, or inferentially by linking the new declaration to the SBOM with a strong identifier.

Then, in some instances, the modified SBOM is subsequently referenced to perform a risk analysis of the corresponding program and/or to make a determine whether the corresponding program contains a file associated with a particular software threat based at least in part on the new declaration, and which would not be possible without the new declaration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 10 illustrates an example of a flow diagram with acts associated with methods for using an SBOM and a configuration restriction record to help resolve threat events.

DETAILED DESCRIPTION

Disclosed embodiments are generally directed to systems, methods and devices for creating and using SBOMs, such as, for example, for facilitating risk assessment and threat mitigation for corresponding programs, and particularly for large programming builds.

In some embodiments, the creation of the SBOMs includes processes for omitting declarations for files or dependencies referenced in chunk SBOMs of corresponding program chunks that are incorporated into a final programming build, but which are not actually utilized by the final programming build, as well as processes for adding new declarations for code segments that are not properly attributed or recognized in the declarations of the related chunk SBOMs, even though code segments are utilized by the final programming build.

In other embodiments, SBOMs are used in combination with configuration restriction records to assess and resolve threat events in a manner that can prevent unnecessary remedial actions for threat events that appear to be relevant to one or more files or dependencies incorporated into a program, based on the identification of files or dependencies declared in a program SBOM, but which are not actually utilized by the program according to particular restrictions that are identified in the configuration restriction records.

Technical benefits of the disclosed embodiments include facilitating the creation of SBOMs that are more accurate and for enabling correspondingly more accurate risk assessments of programs that the SBOMs belong to. The technical benefits also include facilitating the conservation of resources that are used to perform remedial actions for threat events, by resolving threat events that initially appear to be relevant to programs, but that do not actually pose risks to the programs as they are currently configured and utilized during runtime.

Figure 1:
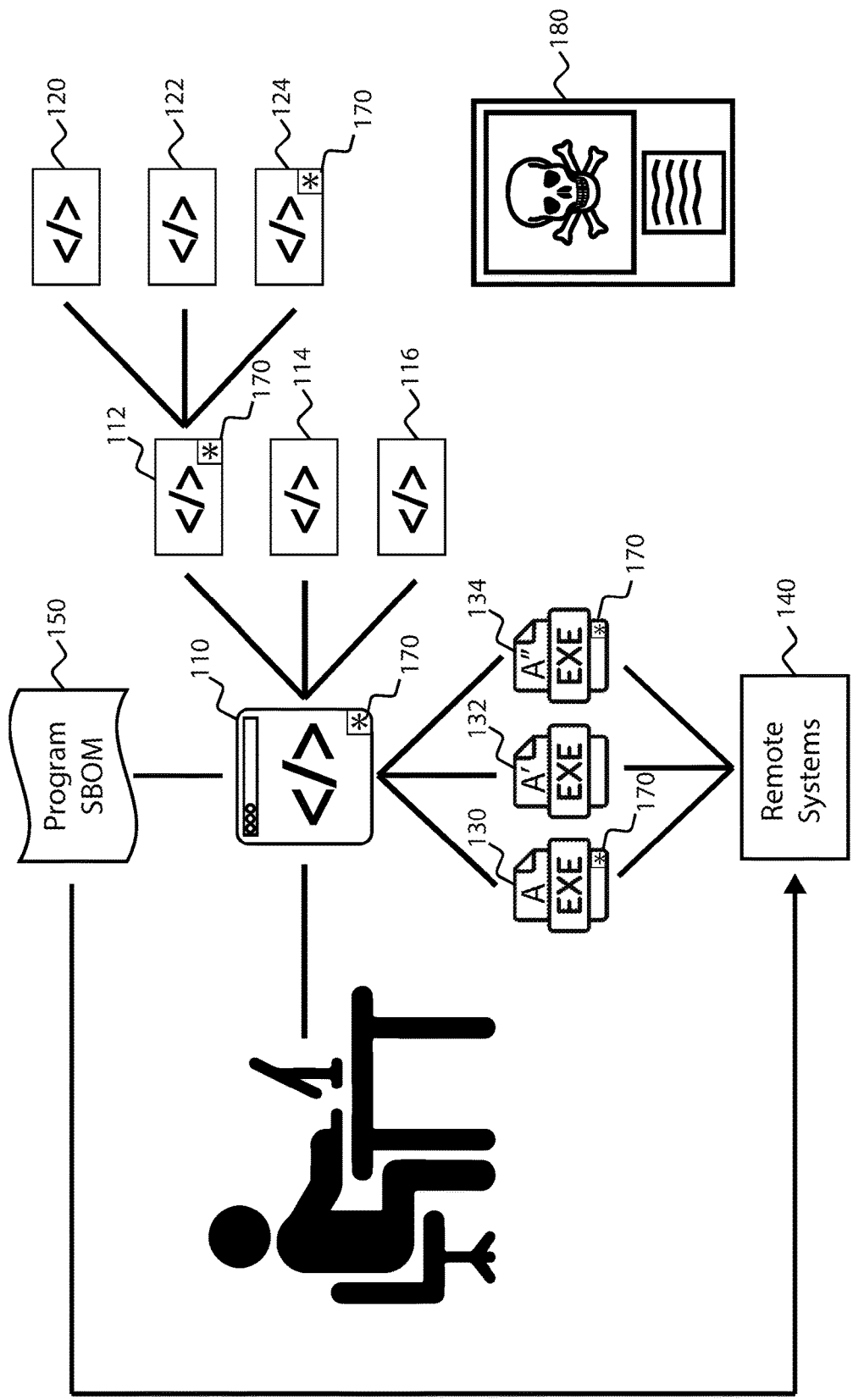
FIG. 1 illustrates a developer environment in which a program is developed and deployed.

Attention is now directed to FIG. 1, which illustrates an environment in which a developer creates a program 110 that can be deployed in one or more configurations to various end-users to accommodate the different needs and preferences of the end-users.

Some of the code that is used to develop the program 110 will be authored directly by the developer. Other code is copied or incorporated, either entirely or partially, from one or more upstream components (e.g., files/programs 112, 114, 116). Additionally, each of those upstream components will also incorporate code from or otherwise depend on other upstream software components (e.g., files/programs 120, 122, 124), and so forth.

It will be appreciated that the representation shown in FIG. 1 is a very simplistic and that the development of most programs much more complex and can involve many different developers and hundreds or even thousands of different files and file dependencies that are incorporated into a single program.

Additionally, once the program is created, it can be modified into different configurations or builds 130, 132, 134, which are ultimately deployed to one or more remote systems 140. It will be appreciated that the different builds 130, 132, 134 can all include the same or similar functionality, but may include different formats or features that enable the program to be run on different hardware configurations, for example.

Sometimes, the different builds 130, 132, 134 will also be configured with different and unique combinations of files that are present in a base build of the program 110, but which are not all compiled and deployed in each of the different builds of the program 110. The different builds can also, for example, include updated files and different versions of the program 110, which may be developed and deployed at different times to the same or different end-users.

Unfortunately, some of the code in a program may include a vulnerability 170 (or a plurality of vulnerabilities) that can be exploited by malicious actors and malware, collectively represented as threat event 180. At times, the vulnerability 170 is intentionally created by a malicious actor in code segments that are subsequently and unknowingly incorporated into a program by the program developer. Other times, the vulnerability 170 is a result of an unintentional flaw that is coded into the program by the developer or that was unintentionally coded into an upstream file/code segment.

To help assess the risk profile of a program 110, a user can evaluate the different components of the program to determine whether any of those components are associated with known vulnerabilities or software threats. An SBOM can help a user perform this assessment. For instance, for each new threat event 180 that is discovered, program SBOM 150 can be referenced to see whether any correlated files associated with the new threat are present within the program SBOM 150 for the program 110. When a correlated file is declared in the program SBOM 150, it is likely that the program 110 is at risk. Alternatively, when a correlated file is not present in the program SBOM 150, it is unlikely that the program 110 is at risk of the new threat event 180.

Certainly, the benefit and utility of performing such a risk assessment will, in large part, depend on the accuracy of the declarations in the SBOM. In particular, SBOMs that are underinclusive (identifying less than all of the software components of the program) will be unable to identify risks associated with software threats targeting vulnerable code of a program that is not identified in the SBOM. Likewise, SBOMs that are overinclusive (identifying software components that are not included in or utilized by the program) may falsely identify risks associated with software threats targeting vulnerable code that the program may not actually include or utilize due to a particular configuration or restriction associated with the program at runtime, for example.

The foregoing problems are even more pronounced for large programming builds, such as operating systems and other large programs that incorporate thousands of files and that can be configured into thousands of different permutations.

To help alleviate some of the foregoing problems, the National Telecommunications and Information Administration (NTIA) has identified some basic guidelines for identifying the underlying code and dependencies of a program. For instance, the NTIA has indicated that the SBOM should include information about the author of the SBOM data and a timestamp, along with declarative identifiers, referred to herein as declarations, that can be used to identify the source and other basic attributes of the code (e.g., files or code segments) that are incorporated into a program, such as, but not limited to identifiers that identify the supplier name, component name, version of the component, and other unique identifiers (e.g., Software Identification (SWID) Tags, Package Uniform Resource Locators (PURL), Common Platform Enumeration (CPE), or other such identifiers).

The NTIA has also indicated that the SBOM should include declarations that identify dependency relationships that define how and where different software components fit together. As per the NTIA, the declaration of a dependency relationship "enables the representation of transitivity from a piece of software to its component and a potential sub-component."

The NTIA has not limited the format for making the foregoing file and dependency declarations and there are numerous standards that have emerged, including Software Product Data Exchange (SPDX), CycloneDX, and software identification tags (SWID), which are configured to include similar declarative information.

By way of example, the following chart illustrates different fields used for making SBOM declarations for the different components of a program according to the SPDX 2.2.1 standard.

| NTIA field | NTIA description | SPDX 2.2.1 field |
|---|---|---|
| Supplier Name | The name of an entity that creates, defines, and identifies components | Package Supplier |
| Component Name | Designation assigned to a unit of software defined by the original supplier | Package Name |
| Version of the Component | Identifier used by the supplier to specify a change in software from a previously identified version | Package Version |

-continued

| NTIA field | NTIA description | SPDX 2.2.1 field |
|---|---|---|
| Other Unique Identifiers | Other identifiers that are used to identify a component, or serve as a look-up key for relevant databases | Package SPDX Identifier |
| Dependency Relationship | Characterizing the relationship that an upstream component X is included in software Y | Relationship |
| Author of SBOM Data | The name of the entity that creates the SBOM data for this component | Creator |
| Timestamp | Record of the date and time of the SBOM data assembly | Created |

It will be appreciated that a program SBOM and its corresponding declarations can also include additional information, such as licensing information and any other declarative information, which may be presented, for example in annotations within the SBOM. Other non-limiting examples of information that may be contained in an SBOM, includes information that identifies the SBOM creator(s), names of referenced document(s), references to one or more other SBOMSs, and other such information. For example, a base SBOM may include a field that identifies a separate SBOM that lists program dependencies of files associated with the base SBOM, and rather than explicitly declaring each of those individual dependencies in the base SBOM.

Regardless of the standard used to create the SBOM, the SBOM can be saved and formatted into different formats (e.g., JSON, XML or other formats) to accommodate different needs and preferences and for facilitating storage and access to the declarations of the SBOMs.

In regard to the foregoing, it will be appreciated that the scope of the invention is not intended to be limited to any singular format for making the declarations in the SBOM. Instead, the scope of the invention is directed more broadly to embodiments for creating, modifying and utilizing SBOMs, regardless of the standard and formats used by those SBOMs. And, even more broadly, the disclosed embodiments include various systems and method for facilitating the creation, modification and use of SBOMs that have (i) different file declarations that identify different files or code segments that are included in a program, as well as attributes and characteristics of those files/code segments, as well as (ii) dependency declarations that identify one or more related files or code segments that are relied upon by files in the program or that are incorporated into functionality of the files of the program corresponding to the SBOM, regardless of the particular format and standard used to make the declarations.

Figure 2:
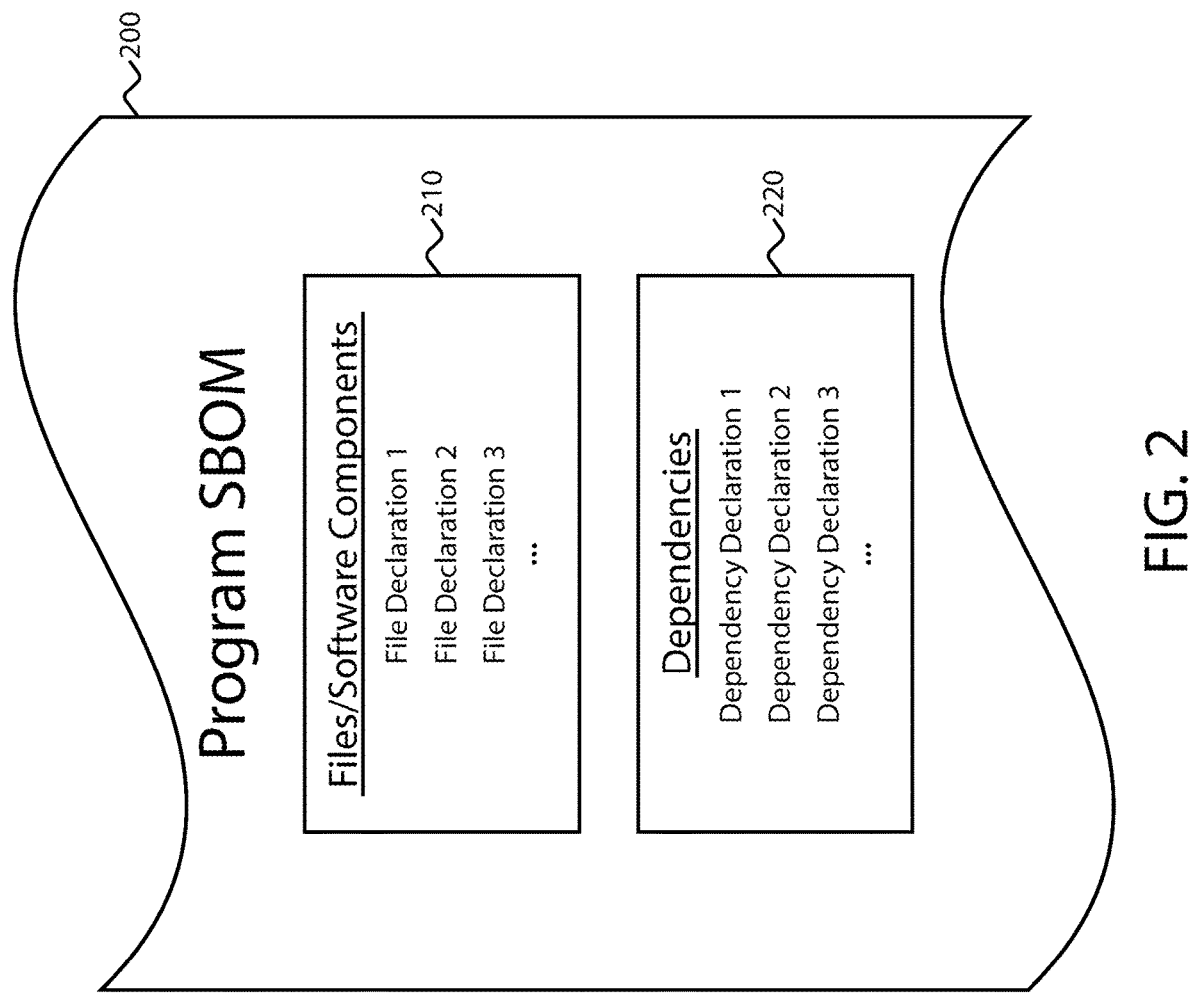
FIG. 2 illustrates an example representation of an SBOM.

FIG. 2 illustrates an example representation of a program SBOM 200, which includes one or more file declarations 210 and one or more dependency declarations 220. While not explicitly shown, it will be appreciated that the program SBOM 200 may also include additional information, as mentioned earlier, such as authorship and timing information associated with creating the SBOM, as well as other information.

In some instances, the SBOM is verifiable by the use of a strong identifier, such as, but not limited to a hash or other representation of the SBOM image. Such an identifier can be associated with the SBOM by one or more attestation records, for example, which are stored and/or referenced with the SBOM.

Digital signatures are another non-limiting example of a strong identifier that can be used to attest to the validity of the SBOM, to provide assurance that the contents of the SBOM have not been modified. When digital signatures are used, they can be signed with a key of the developer and/or third-party. It is also possible for the SBOM to verified with the combined use of multiple different identifiers, including but not limited to a hash and a digital signature of the SBOM, as well as any other strong identifier configured to provide a level of assurance that the contents of the SBOM have not been modified.

In some descriptions that follow, embodiments are provided for modifying an SBOM. This is possible, even when using the foregoing verification processes, by creating and tracking the modifications to the SBOM with new strong identifiers associated with the SBOM and each new declaration and/or modification made to an existing SBOM, for example. Additionally, or alternatively, as will be described, records can also be generated and used to identify and associate effective changes related to the declarations of an SBOM, but which do not actually modify contents of an SBOM directly, but which are linked to the SBOM as a sort of addendum to the SBOM to clarify the modifications associated with the declarations of the SBOM.

Figure 3:
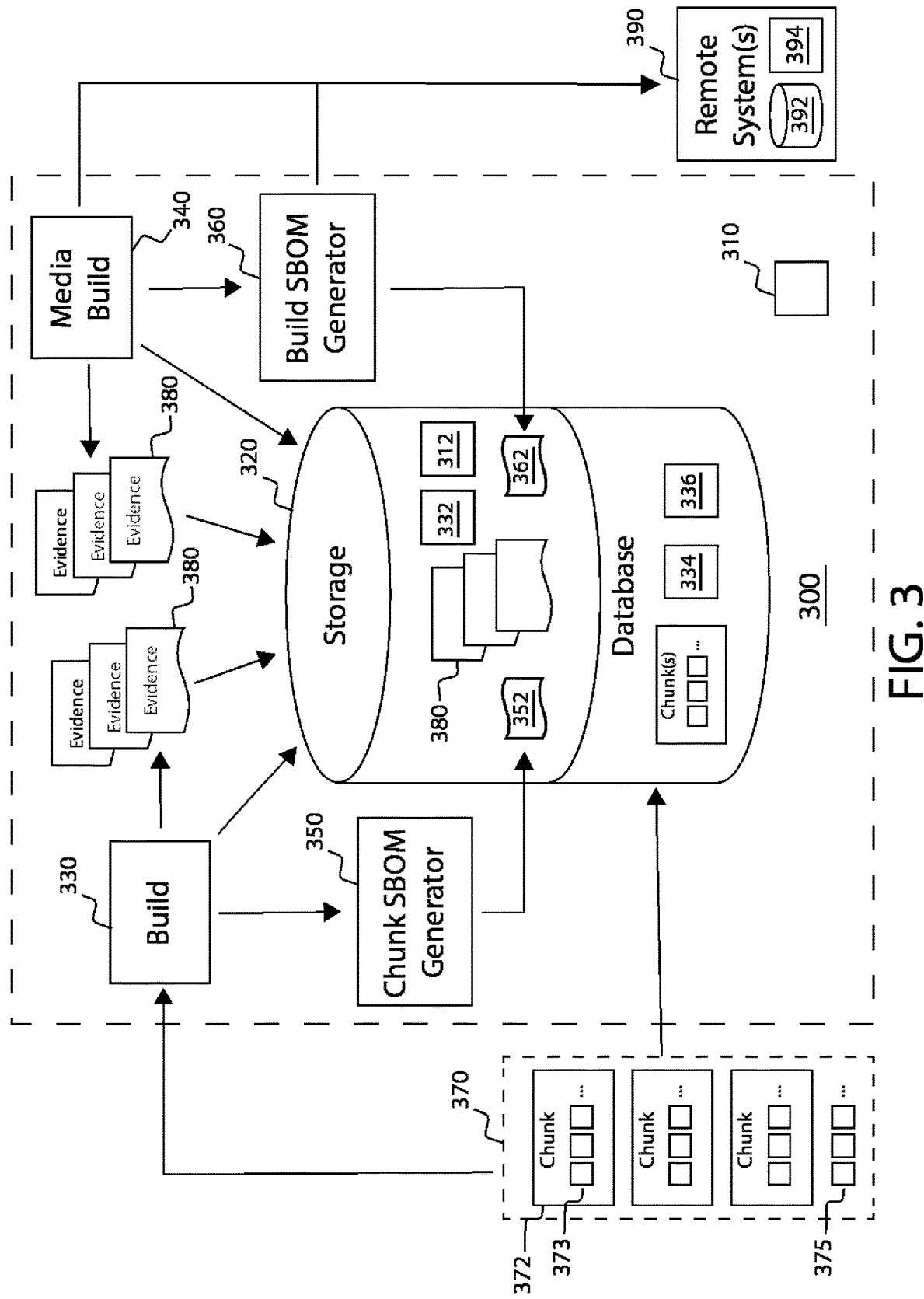
FIG. 3 illustrates a computing environment that includes a server system that is configured for developing and deploying a large programming build.

Attention will now be directed to FIG. 3, which illustrates a computing system 300 that is also referred to herein as a system. This computing system 300 may comprise a localized server or a standalone system. Alternatively, the computing system 300 is a distributed computing system in which one or more of the system components are contained in different and remotely located computing hardware and software components.

As shown, the computing system 300 includes one or more hardware processors 310, as well as storage 320 that stores computer-executable code 312 that is executable by the one or more hardware processors 310 to configure the computing system 300 and/or one or more remote system(s) 390 to implement the methods described herein, such as the disclosed methods for creating, modifying and utilizing an SBOM. The remote system(s) 390 also include one or more corresponding storage devices 392 and hardware processor(s) 394 that execute instructions stored on the storage devices 392 for configuring the remote system(s) to perform the disclosed functionality described herein.

The computing system 300 also includes a build engine 330 that is configured to identify, aggregate and/or build different chunks of code that are subsequently assembled into one or more build configurations for a program that is deployed to one or more end-users/remote systems. Each program chunk may be a standalone application or program that can be integrated into the large/larger programming build that incorporates a plurality of different program chunks. Each of these chunks (e.g., chunk 372) comprises a plurality of different files (e.g., files 373) and/or incorporates or depends on one or more other files 375 accessible to the system.

The various chunks 372 and files 375 are obtained from one or more monolithic repositories, referenced as code resource 370. Each of the files and chunks in the code resources 370 can comprise precompiled source code, post-compiled binaries and/or even intermediate format instructions comprising assembly language. In some instances, the files are library files (e.g., dll files) or other reference files used by a program. The monolithic repository may also store standalone files (generally included in the files 375 that are available to the system), which may not be directly included in or related to any existing chunk 372 in the repository.

In some instances, the code resource 370 comprises a large enterprise repository of files and program chunks that contains hundreds and sometimes thousands of different files and program chunks that are available for assembly into a single large programming build that is being created by the same enterprise and which utilizes at least some, but not all, of the files in the plurality of program chunks.

In some instances, the code resource 370, additionally and/or alternatively, comprises third-party and open-source program chunks and files that are stored within storage of the enterprise and/or within other storage devices of remote systems.

The build engine 330 is configured to passively receive files and program chunks from the code resource 370 in some embodiments. Alternatively or additionally, the build engine 330 is configured to actively request and obtain the files and program chunks. The build engine 330 is also configured to compile or otherwise combine one or more files into one or more of the referenced program chunks.

In some instances, the build engine 330 identifies a build to generate and also identifies all of the files/chunks that are necessary for creating that build. The build engine also assembles the corresponding build by combining the different program files and chunks into a build 334 that can be stored by the system in a database or other storage location accessible to the system. By generating a build from multiple chunks that each incorporate different files, it is likely typical that some of the program chunks of the build 334 will include one or more files that are utilized by the build 334 and one or more files that are not utilized by the build, particularly as different builds are generated for different runtime configurations.

By way of example, some files may comprise test files that were used when generating a chunk that includes the test files, but which are not used by the final programming build configuration that incorporates the chuck having the test file(s).

By way of further example, a chunk incorporated into the final build may also include one or more files for inapplicable and/or obsolete relative to that build. For instance, a single chunk may include a plurality of different drivers and library files that enable functionality for a variety of different functions, including one or more functions that are restricted or inoperable with the final build and/or for a final end-user runtime configuration.

The build engine 330, during the build process and during other processes associated with generating or modifying chunks or files for the build, identifies evidence 380 that relates to the different chunks, files and code segments that are being assembled and compiled into the build 334. This process of identifying evidence 380 may also include generating the evidence 380 and storing the evidence 380. The evidence 380 may be stored, for example, as digital records within one or more tables contained in the storage 320.

The evidence 380 may include information related to a time in which the chunks and files are processed and assembled into the final build, as well as the software and hardware used to perform the processing and assembly. The evidence may also include information related to the specific processes that are performed when generating, modifying and assembling the different files and chunks into a build 334.

Yet additionally, the evidence 380 may further include information related to users that handled or interacted with the different files during assembly of the build, as well as the identification of other code that was being handled, processed or stored by the system at the same time (whether by the same components or different components of the system).

Notably, the referenced evidence can broadly include any combination of the foregoing types of evidence, as well as other types of evidence associated with the creation, processing and/or handling of files, chunks or any code segments utilized by a program and/or referenced by the SBOM of that program.

As shown, the computing system 300 also includes a chunk SBOM generator 350 which is configured to identify and/or generate an SBOM for each program chunk that is generated and/or incorporated into the final build.

In some instances, each of the various program chunks already include and/or are associated with a corresponding chunk SBOM that includes declarations of files and dependencies of files incorporated into the program chunk. In some embodiments, the chunk SBOM reference will include one or more source file(s) (e.g., .c, .cpp, .h files), object file(s) (e.g., .o files), one or more static libraries (e.g., .a files), portion(s) of a source file (e.g., specific lines or functions), Internet post(s) (e.g., stackoverflow posts that include source code examples), etc.

When an SBOM already exists, the SBOM generator can verify the contents of the SBOM and corresponding program using different verification techniques, including the performance of a hash analysis of the SBOM.

When a new or identified program chunk does not include a corresponding chunk SBOM, the chunk SBOM generator 350 is configured to generate a chunk SBOM for the program chunk based on an analysis of the files that are included in the program chunk, as well as the known dependencies of the files. The chunk SBOM generator 350 can rely on the evidence 380 when generating the SBOM, to declare dependencies and files that are incorporated into a program chunk, as well as to declare their corresponding attributes based on the evidence 380.

When generating the chunk SBOM, the chunk SBOM generator 350 is configured to generate a strong identifier for any newly generated chunk SBOMs. This strong identifier can be a hash of the SBOM image or a digital signature of the chunk SBOM, for example.

Each chunk SBOM 352 can be stored in the storage 320 of the system, either with the corresponding chunk or separately. In some instance, for example, the different chunks are stored in a database of the system storage, while the corresponding chunk SBOMs are stored in a separate location of storage, along with an SBOM correlation table 332 that includes records that identify relationships between different SBOMs and corresponding program chunks, as well as their strong identifiers.

The strong identifiers, which can be stored with their SBOMs and/or in a different location, are used to verify the different chunk SBOMs have not been modified and are referenced when verifying that the different program chunks SBOMs properly identify the files and dependencies included in the corresponding program chunks.

FIG. 3 also illustrates how the system includes a media build engine 340 that is configured to identify a specific end-user build configuration to generate. This configuration can be generated by modifying build 334, or it can be generated newly by using a combination of the program chunks described above, and which are stored in the system database or other monolithic repository accessible to the system.

Prior to generating the media build 336, the media build engine 340 receives input specifying parameters for the media build 336 that is to be generated. These parameters may include or be based on software or hardware capabilities of an end-user, subscription or policy parameters, or other end-user runtime parameters.

Then, the media build engine 340 modifies build 334 to generate the media build 336 and/or utilizes the existing program chunks to generate the media build 336. When generating a media build by modifying an existing build, the media build engine 340 can add or remove files from the build 334, as well as add or remove restrictions associated with controls built into the media build for utilizing one or more files of the previous build.

The media build engine 340 also identifies and/or generates additional evidence 380 that is associated with generation of the media build 336, including processes performed and software/hardware/entities involved in performing the processes required to generate the media build 336, such as any processes required for modifying the existing build and/or for modifying program chunks assembled into the media build 336. The evidence may also include the user input and parameters provided to the media build to define the desired configuration of the media build.

In some embodiments, the evidence 380 obtained by the media build engine 340 and/or the build engine 330 includes information generated during one or more phases (e.g., preprocessing, compilation, linking) of a compilation toolchain. By way of example, in the context of the C programming language, a preprocessor translates a source code file (e.g., "main.c") into a preprocessed version of the file, which typically includes all the header files used by the file in one linear file. Later, a compiler semantically and syntactically translates this preprocessed input into machine language, resulting in an object file (e.g., "main.o"). A linker then translates one or more object files, static libraries, etc. as a group, resulting in an output binary (e.g., "program.exe", "useful.dll").

In one embodiment, the evidence 380 includes information obtained during operation of a compilation toolchain, which is indicative of portions of the code resource 370 that are not included in the build 334 and/or the media build 336. For example, the evidence 380 may indicate that a function defined in the code resource 370 was not used in a final binary (e.g., build 334 and/or the media build 336), even if that function was included in an object file or static library, or was excluded by the preprocessor.

In another example, the evidence 380 includes data generated during a preprocessing phase. For instance, the C and C++ programming languages leverage non-syntactic preprocessors that operate on preprocessor directives included in a source code file, and which enable conditional compilation of portion(s) of source code contained in that file based on an environment in which the source code is being compiled, flags passed to the preprocessor, and the like.

Notably, because the C and C++ preprocessors are non-syntactic, they do not understand language-specific concepts such as functions. At the same time, based on preprocessor directives, they allow conditional removal of entire lines of a source file. Some preprocessors track which source file line(s) were retained (e.g., a source file, all header files included in the source code file, and the retained line numbers the source code file), and correlate the original source code (e.g., file+line numbers) to lines in the preprocessor's generated output (which the input for a compiler). Such tracking and/or correlation information is included in the evidence 380.

In order to make tracking and/or correlation information easier to consume, the disclosed systems are configured to export this information as computer-parsable structured metadata, such as with a preprocessor. Accordingly, in some embodiments, based on preprocessing phase information included in evidence 380, the computing system 300 will automatically determine that a region of interest within the code resource 370 has been entirely excluded prior to reaching the compiler, and the chunk SBOM generator 350 and/or a build SBOM generator 360 (discussed below) will determine that a corresponding region of interest should be excluded from an SBOM.

In another example, the evidence 380 includes data generated during a compilation and/or linking phase. Compilation commonly includes processing by programs (e.g., compiler, linker) having syntactic knowledge of language structure, and these programs may perform additional optimizations, such as during compilation, during whole-program optimization (WPO), and/or during Link Time Optimization (LTO). With such optimizations, the system may determine that a function (e.g., one which exists in a source file, object file, or static library) can never be reached, and thus exclude that function entirely from that phase's output. Accordingly, in some embodiments, information about code that was excluded due to optimization will be included in the evidence 380. In such embodiments, the program performing that phase may be enhanced to export computer-parsable structured metadata indicating that the function was entirely excluded for a generated file (or alternatively, exhaustively list all remaining functions).

It will be appreciated, in view of at least the foregoing example, that some embodiments, the computing system 300 can automatically determine that a region of interest within the code resource 370 (e.g., a particular function) has been entirely excluded based on optimization (e.g., during compilation or linking phase), and the chunk SBOM generator 350 and/or a build SBOM generator 360 (discussed below) can determine that a corresponding region of interest (e.g., function) may be excluded from an SBOM, based on optimization information included in evidence 380 that includes data on functions included and/or excluded for a generated file.

In some embodiments, the evidence 380 also includes information about which libraries, objects, and symbols were selected for inclusion into a final binary based on use of private debug symbols generated during compilation. Then, based on knowledge of how the objects were produced, the chunk SBOM generator 350 and/or a build SBOM generator 360 (discussed below) can determine which source files were needed to build objects that were actually used by the final binary (e.g., as being statically or dynamically linked into the binary).

By way of example, suppose that foo.dll links to an open-source component whose object files are bundled into a library, oss.lib. Suppose further that oss.lib includes object file oss.obj having function1( ) and function2( ). Based on private symbols, the evidence 380 can indicate that, even though foo.dll links to oss.obj, it may only include function1( ), and not function2( ).

The evidence obtained by the media build engine 340 and the build engine 330 are collectively referred to herein as evidence 380 and may be stored in the same or different tables associated with the different processes being performed and hardware/software being utilized when generating the different builds.

The computing system 300 also includes a build SBOM generator 360 which is configured to create/generate a build SBOM for each build 334 and media build 336 that is generated by the system. As previously noted, each of the builds 334/336 will incorporate and utilize at least some files from a plurality of different chunks, but not all of the files of each chunk that is incorporated into the large programming builds.

The build SBOM generator 360 is configured to examine the evidence 380 to determine which files or file dependencies referenced in the chunk SBOMs for the incorporated program chunks of the build are not actually enabled or utilized for a particular build, based on current configurations of the build and/or future restrictions that will be imposed during runtime configurations at end-user systems.

Then, the build SBOM generator 360 creates/generates the build SBOM by including declarations from the different chunk SBOMs (for the chunks that are incorporated into the programming build) into the build SBOM 362, and while omitting any file or dependency declarations from the chunk SBOMs that are determined to correspond to the one or more files or dependencies that the build SBOM generator 360 has also determined (based on the examined evidence) are not actually enabled or utilized for the particular build (based on current configurations of the build and/or future restrictions that will be imposed during runtime configurations at end-user systems). In some embodiments, the build SBOM reference will include one or more source file(s) (e.g., .c, .cpp, .h files), object file(s) (e.g., .o files), one or more static libraries (e.g., .a files), portion(s) of a source file (e.g., specific lines or functions), Internet post(s) (e.g., stackoverflow posts that include source code examples), etc.

Once the build SBOM generator 360 has generated the build SBOM, it will sign and/or generate a hash of the build SBOM, to be used as a strong identifier for enabling subsequent verification of the build SBOM. The build SBOM and corresponding strong identifier can be stored separately, or together, in the storage of the system, along with, or separately from the corresponding build. The SBOM correlation table 332 is configured to track the relationship of the corresponding build SBOM, strong identifier and build with one or more SBOM correlation records.

Each chunk SBOM 352 can be stored in the storage 320 of the system, either with the corresponding chunk, or separately. In some instance, for example, the different chunks are stored in a database of the system storage, while the corresponding chunk SBOMs are stored in a separate location of storage, along with an SBOM correlation table 332 that includes records that identify relationships between different SBOMs and corresponding program chunks, as well as their strong identifiers.

Figure 4:
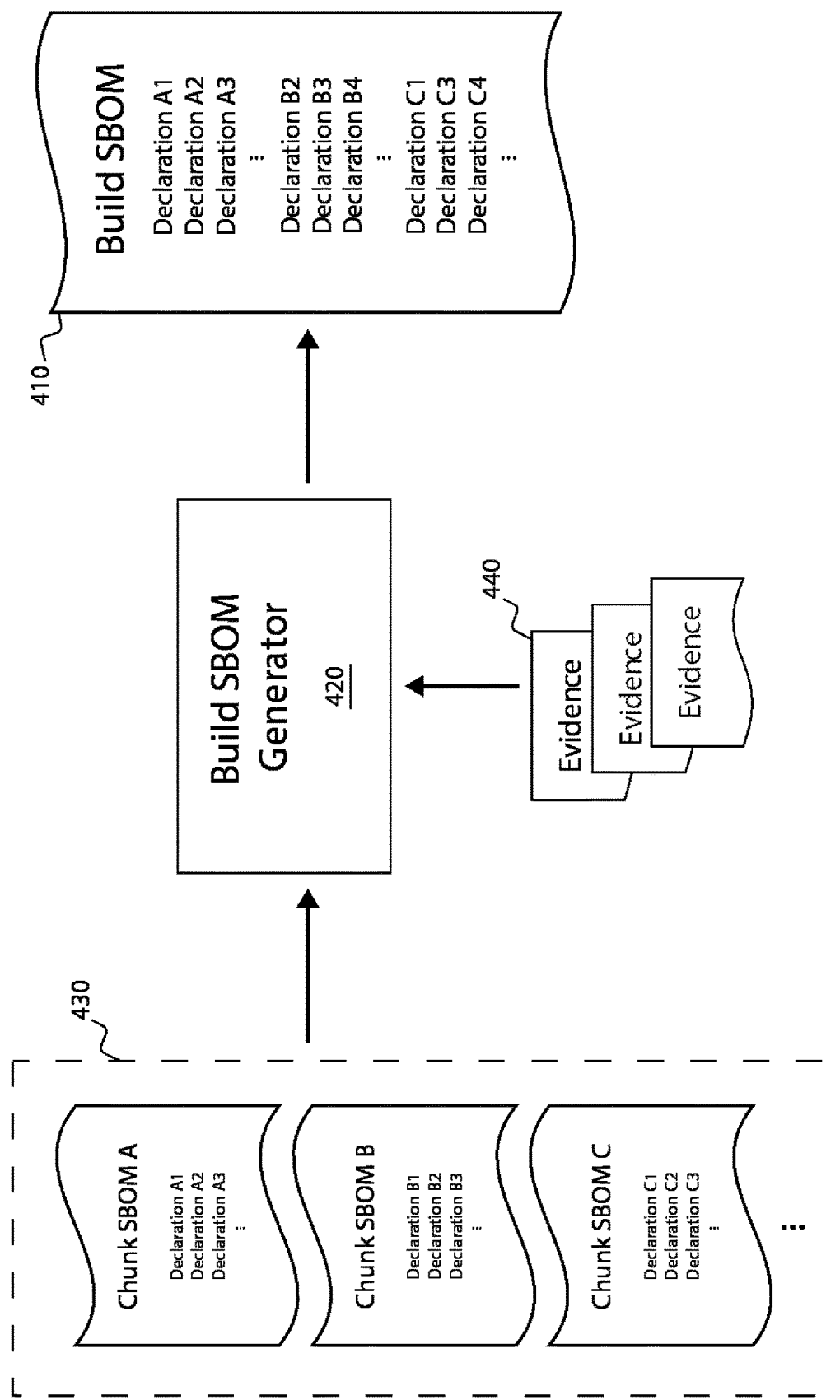
FIG. 4 illustrates an example representation of chunk SBOMs of corresponding programming chunks that are incorporated into a programming build and a related build SBOM corresponding to the programming build, but which omits one or more of the chunk SBOM declarations.

FIG. 4 illustrates an example representation of a build SBOM 410 created by a build SBOM generator 420. The build SBOM 410 is associated with a plurality of chunk SBOMs 430 that correspond with associated program chunks (not shown) that are incorporated into a program build (not shown) that is associated with the build SBOM 410.

As shown, the build SBOM generator 420 is configured to generate the build SBOM 410 to include declarations that are contained within the chunk SBOMs 430. However, one or more of the declarations from the chunk SBOMs 430 are omitted from the build SBOM 410 based on the evidence 440 examined by the build SBOM generator 420 that indicates at least one or more files or dependencies declared in the chunk SBOMs 430 are not utilized by the programming build associated with the build SBOM 410. Accordingly, the build SBOM generator 420 identifies those files/dependencies that are not utilized in the build and omits the declarations for those files/dependencies from the build SBOM, even though they are declared within the chunk SBOMs 430. For instance, in the example shown in FIG. 4, Declaration B1 from Chunk SBOM B and Declaration C2 from Chunk SBOM C are omitted from the build SBOM 410.

Figure 5:
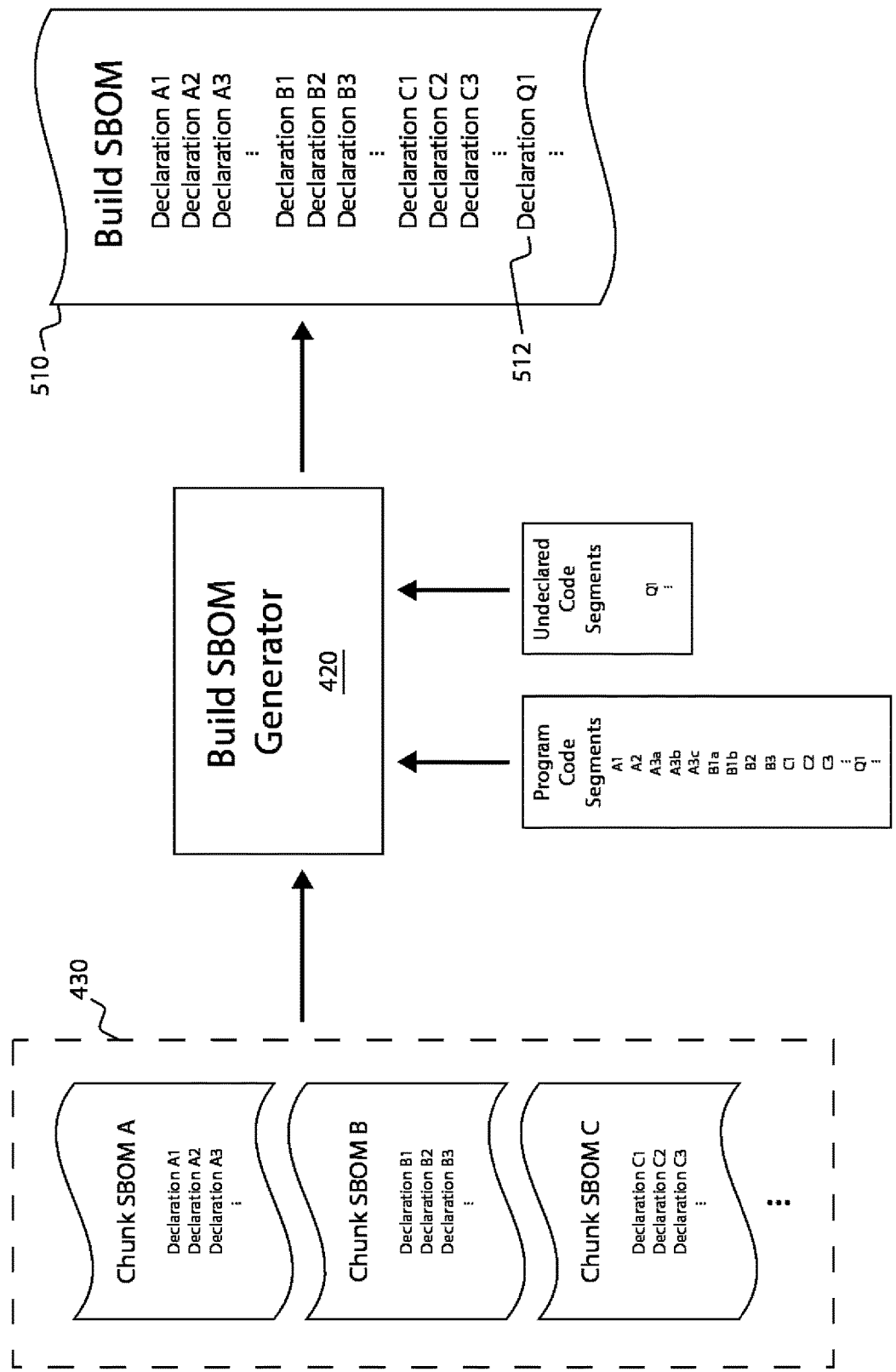
FIG. 5 illustrates an example representation of an SBOM being modified to include new declarations.

FIG. 5 illustrates another example representation of a build SBOM 510 that is created by the build SBOM generator 420. This build SBOM 510 is also associated with the plurality of chunk SBOMs 430 that correspond with the associated program chunks that are incorporated into the program build associated with the build SBOM 510.

However, in this embodiment, the build SBOM generator 420 identifies and adds a new declaration 512 to the build SBOM 510 that is not present in any of the chunk SBOMs 430 of the associated program chunks that are incorporated into the final build. While generating the build SBOM 510, in this embodiment, the build SBOM generator identifies a listing of different program segments that are associated with the files of the program build, as well as a listing of any undeclared code segments that are identified from one or more open source or other third-party sources and which have a threshold similarity to one or more of the program code segments.

The listing of the program code segments includes segments that comprise one or more lines of code that are identified in the program build. These segments are identified by a machine learning module or parsing engine (not shown) and which may be incorporated into the build SBOM generator. In some instances, the segments are identified by the system examining all of the code of the program build, including all of the files utilized by the program build configuration and segmenting the code into segments based on discrete functions and thereafter indexing the different segments.

The system also using a same or similar machine learning module or parsing engine to generate the listing of undeclared code segments. To generate this listing, the system examines code contained in one or more code repositories, including the system's own database and/or open-source repositories, for files that are determined to be related to code utilized by the program build, but which is not presently declared in the chunk SBOMs. Then, when a code segment (e.g., Q1) is identified in the listing of undeclared code segments that matches one of the code segments in the listing of program code segments that are used, the build SBOM generator 420 will include a declaration for that code segment in the build SBOM 510.

In some instances, the undeclared code segment is a segment of code that is depended upon from an upstream file, and which is incorporated into a downstream file that is declared by one of the chunk SBOMs 430, even though attribution is not provided for the dependent upstream code. In other instances, the code segment is copied from an open-source file that is not depended upon. Instead, a developer has simply copied a portion of code from another file when authoring a file that is incorporated into the program.

While the undeclared code segment may not be identical to the program code segment, it will be within a threshold of similarity. This threshold of similarity may be predetermined and set to accommodate different needs and preferences. In some instance, the threshold of similarity means that the undeclared code segment includes at least a certain percentage or magnitude of identical code. In other instances, the threshold of similarity means that the undeclared code segment includes at least a certain percentage or magnitude of identical functionality.

Although not explicitly called out in FIG. 5, it will be appreciated that the listings of the program code segments and the undeclared code segments can be included within the aforementioned evidence that is examined by the different SBOM build generators for creating and/or modifying the different SBOMs described herein.

Figure 6A:
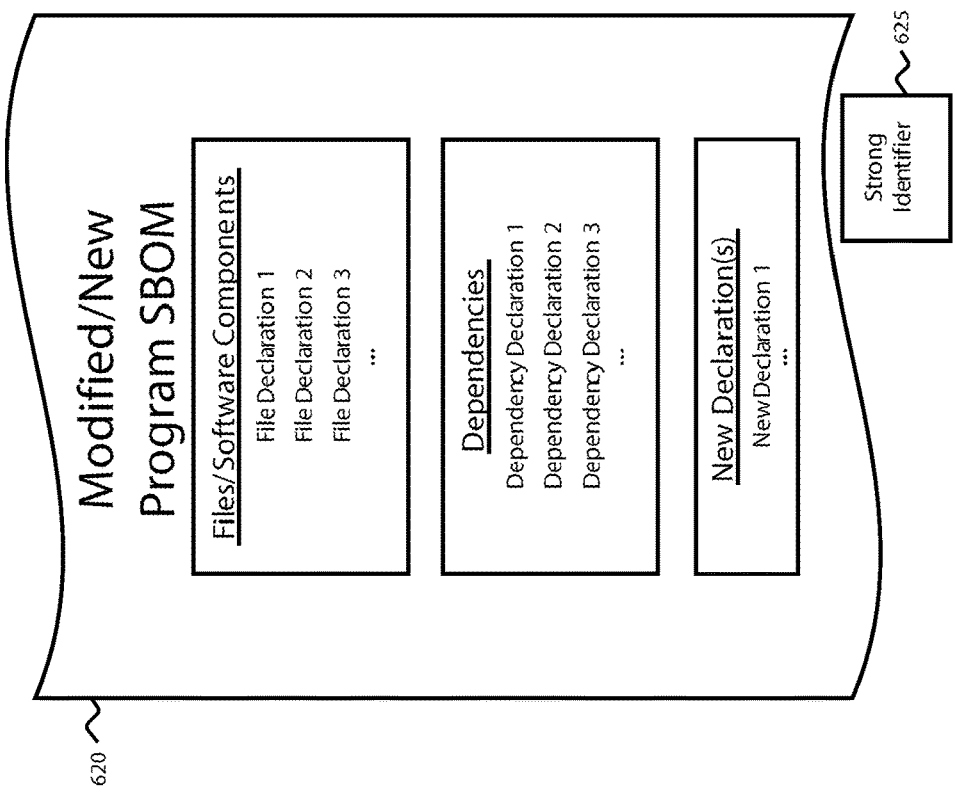
FIGS. 6A and 6B illustrate example representations for modifying an SBOM and/or for generating a new or modified version of the SBOM.
Figure 6A:
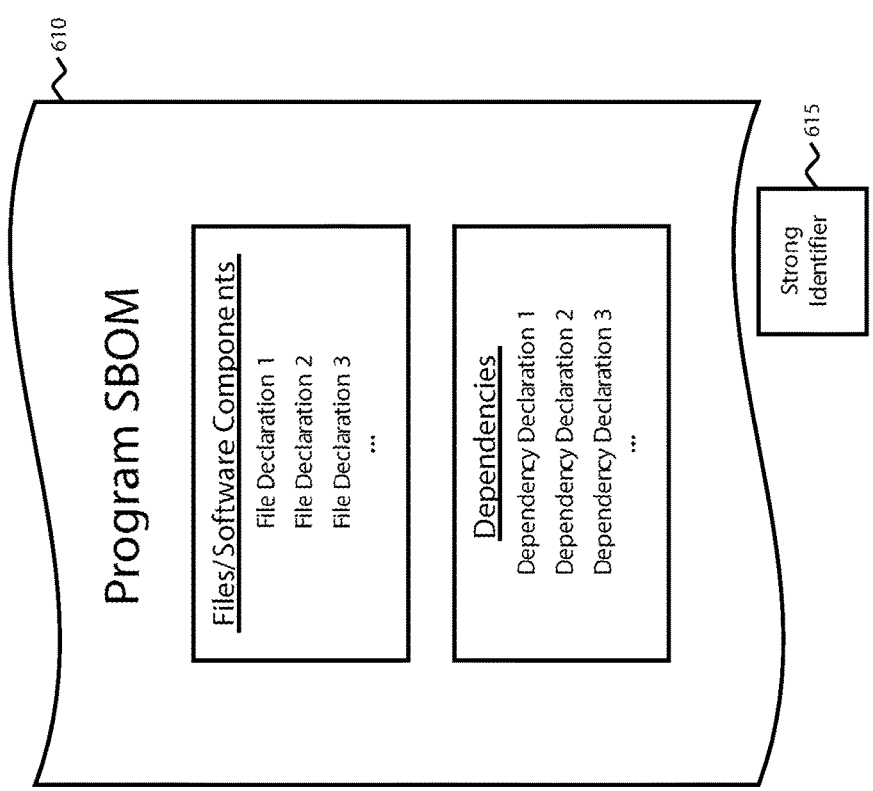

FIG. 6A illustrates an example for modifying an SBOM and/or for generating a new or modified version of the SBOM. In this example, a program SBOM 610 is created for a corresponding program, such as a large programming build. The program SBOM 610 includes various file and dependency declarations, as previously discussed. These dependencies can be made explicitly and/or implicitly. Implicit declarations would include, for example, a declared reference to another/dependent SBOM that explicitly identifies the dependencies that are incorporated by reference into the program SBOM.

Additionally, as also previously discussed, the program SBOM 610 is associated with a strong identifier 615 which may be a hash of the program SBOM 610 or another type of strong identifier that can be used to verify the contents of the program SBOM 610.

In some instances, as a determination can be made to edit an existing program SBOM, based on modifications to the corresponding program, for example, or in response to determining the program SBOM fails to provide proper reference to all files of the program and/or upon determining the program SBOM includes a declaration for a file that is not actually utilized by the corresponding program according to a particular configuration or restriction applied to the program.

According to some embodiments, when a determination is made to generate a new or modified SBOM, the system can use the build SBOM generator and/or other system components to generate the new/modified SBOM.

In the current example, a modified/new program SBOM 620 is generated by modifying contents of the original SBOM, by adding a new declaration to the contents of the original SBOM. Because of this modification, the modified/new program SBOM 620 will have its own strong identifier 625 that associates the present version of the modified/new program SBOM 620 to the strong identifier 625 in a manner that can verify the contents of the modified/new program SBOM 620.

Notably, the SBOM correlation tables that contain records associating different SBOMs with their identifiers and corresponding programs can include records for the original program SBOM 610 and for the modified/new program SBOM 620, which can be useful, for example, when the original program SBOM 610 corresponds to a first configuration of the program and the modified/new program SBOM 620 corresponds to a second configuration of the program. The records can identify the different configurations or restrictions that are associated with the program for with each of the different SBOMs.

Alternatively, the record in the SBOM correlation tables that associates the program with the original SBOM 615 can be updated and/or replaced with a new/updated record that associates the program with the modified/new program SBOM. This embodiment is useful when the modified/new program SBOM 620 is generated to corrects/replace an overinclusive, or underinclusive, program SBOM 610 for a corresponding program, for example.

Figure 6B:
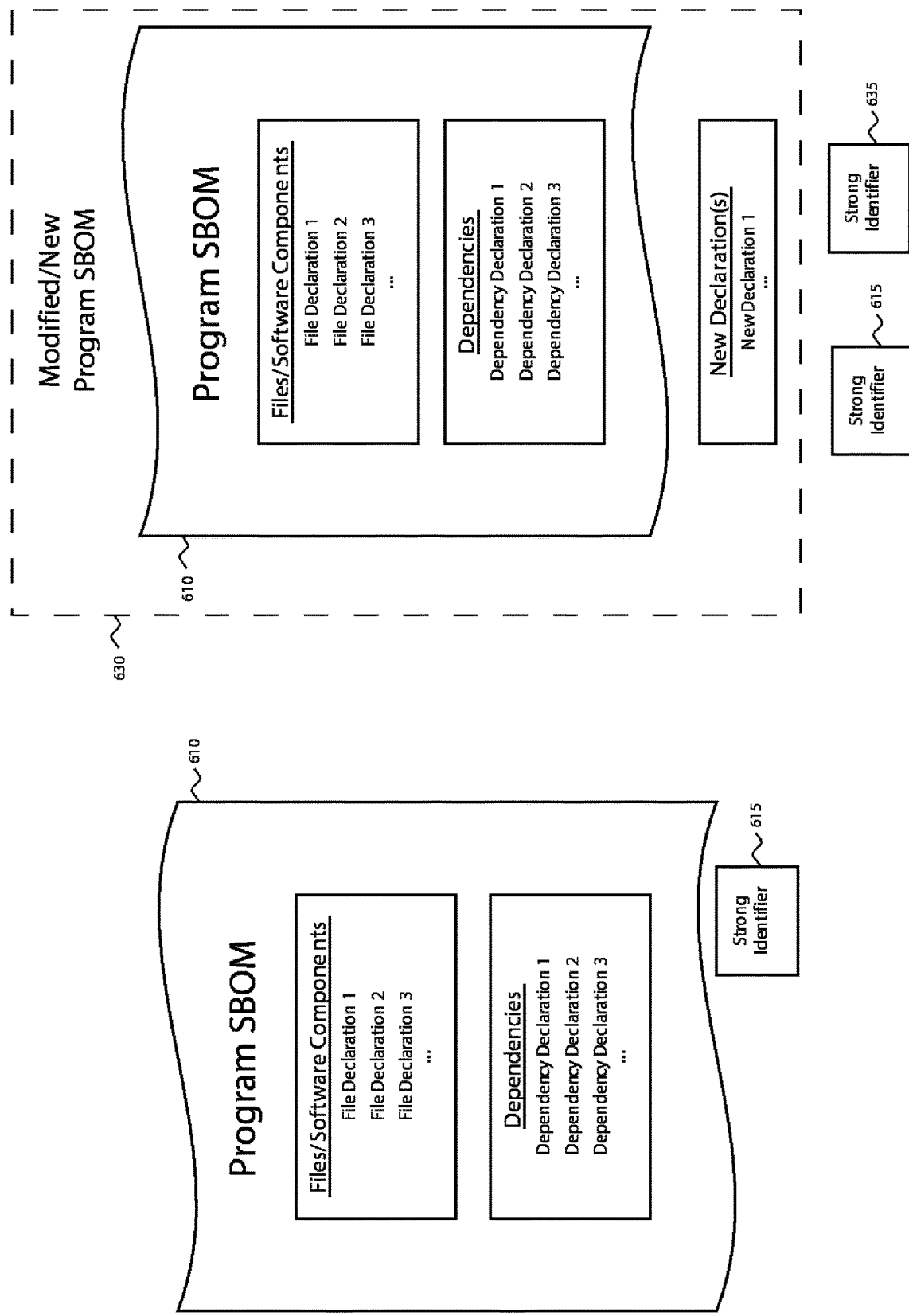

FIG. 6B is similar to FIG. 6A, except that in this example, the modified program SBOM is generated by creating a separate record that includes the new declaration and which is stored separately from the original program SBOM 610, without modifying the actual contents of the program SBOM 610. In this manner, the original strong identifier 615 is still valid for the contents of the program SBOM 610, which is incorporated into the modified/new program SBOM 630. However, the modified/new program SBOM 620 will also include an additional strong identifier 635 for only the new declaration, to verify the contents of that declaration. Alternatively, the new strong identifier 635 can be generated for a combination of the contents of the program SBOM 620 as well as the new declaration. Either way, the records in the SBOM correlation tables that associate the program with the original SBOM 615 and/or with the modified/new program SBOM will be updated to properly identify the relationships between the program configurations and the different SBOMs and SBOM identifiers.

Figure 7A:
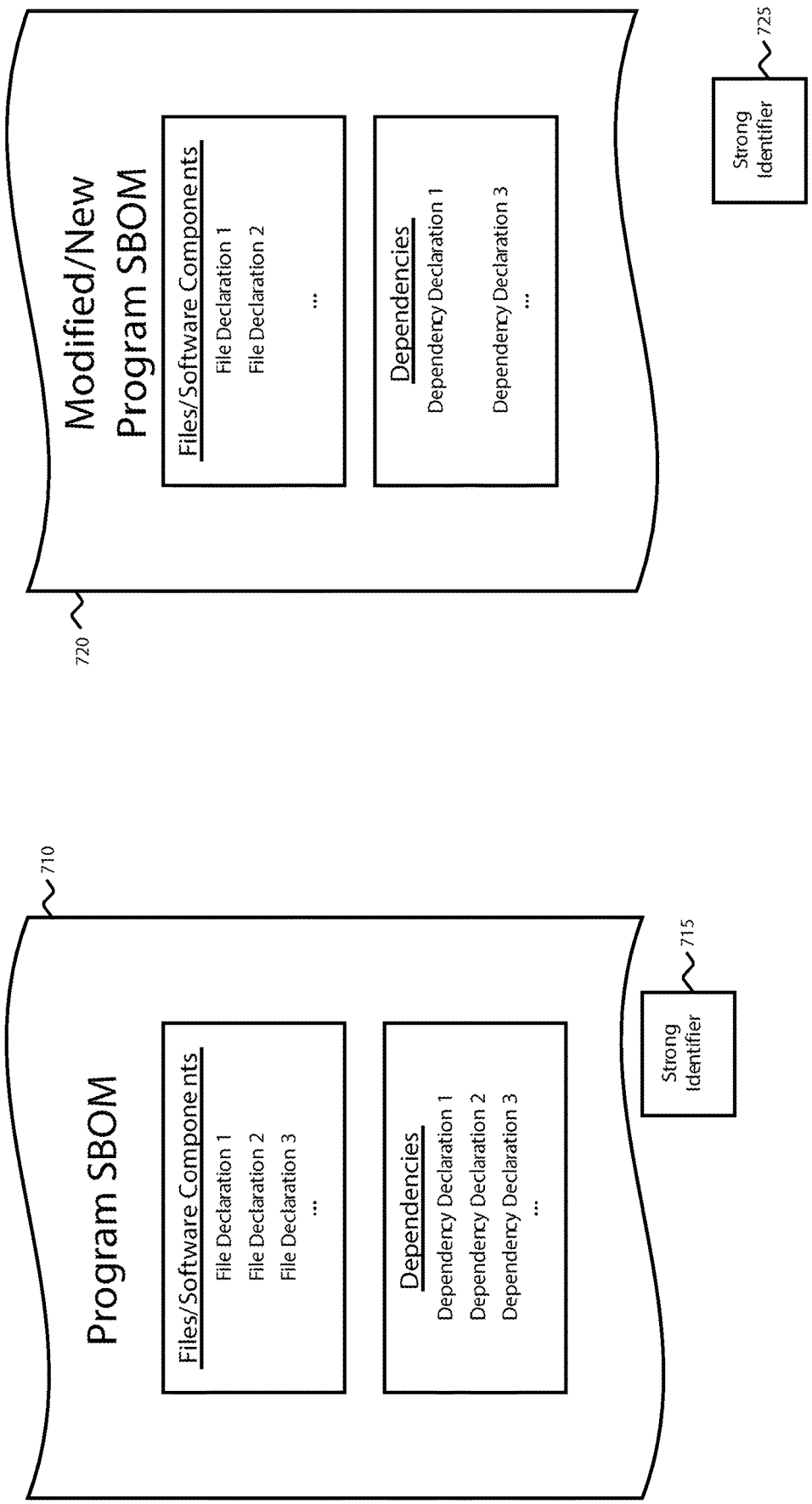
FIG. 7A-7C illustrate example representations of SBOMs being modified to omit or delete declarations.
Figure 7B:
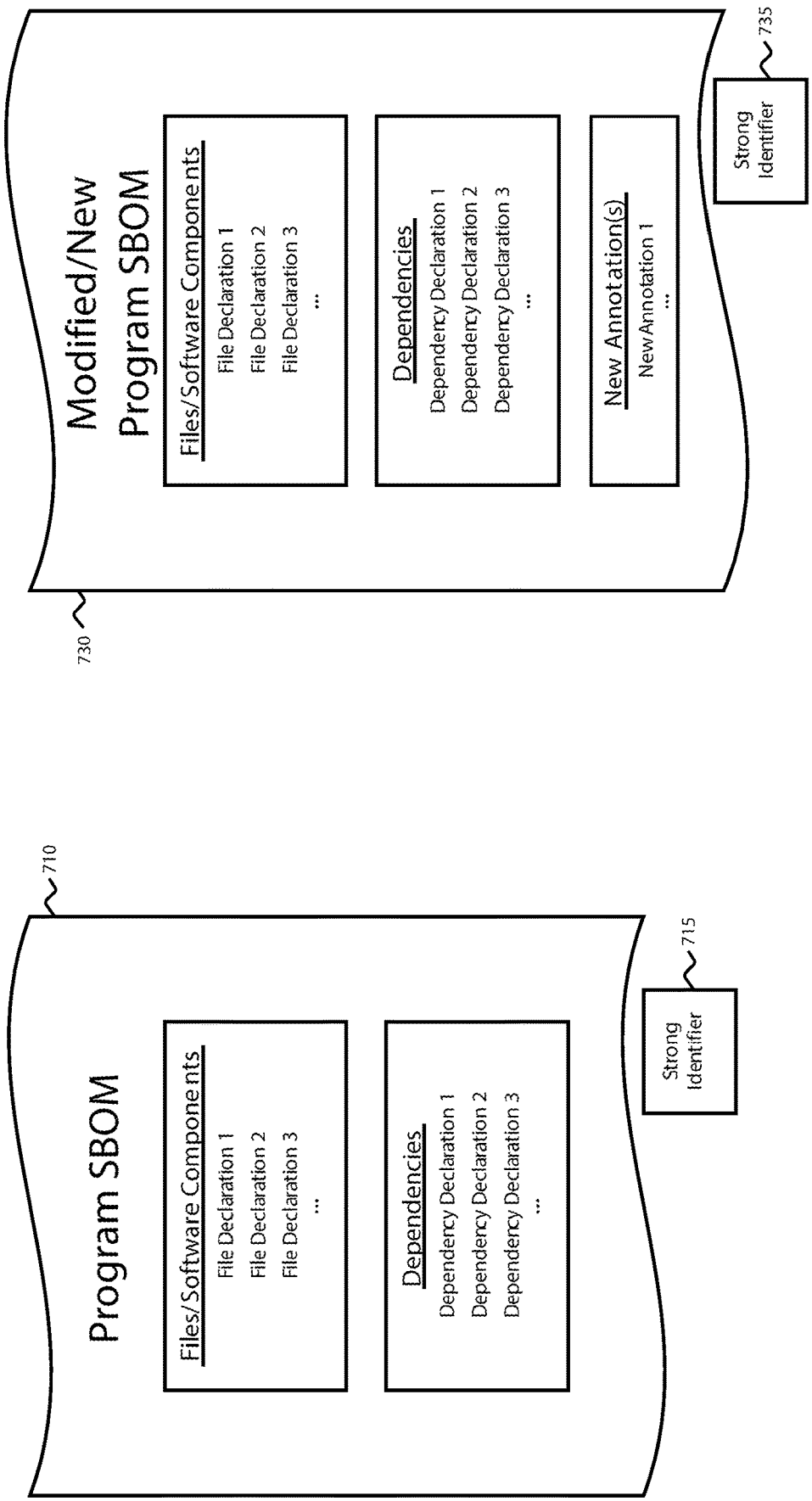
Figure 7C:
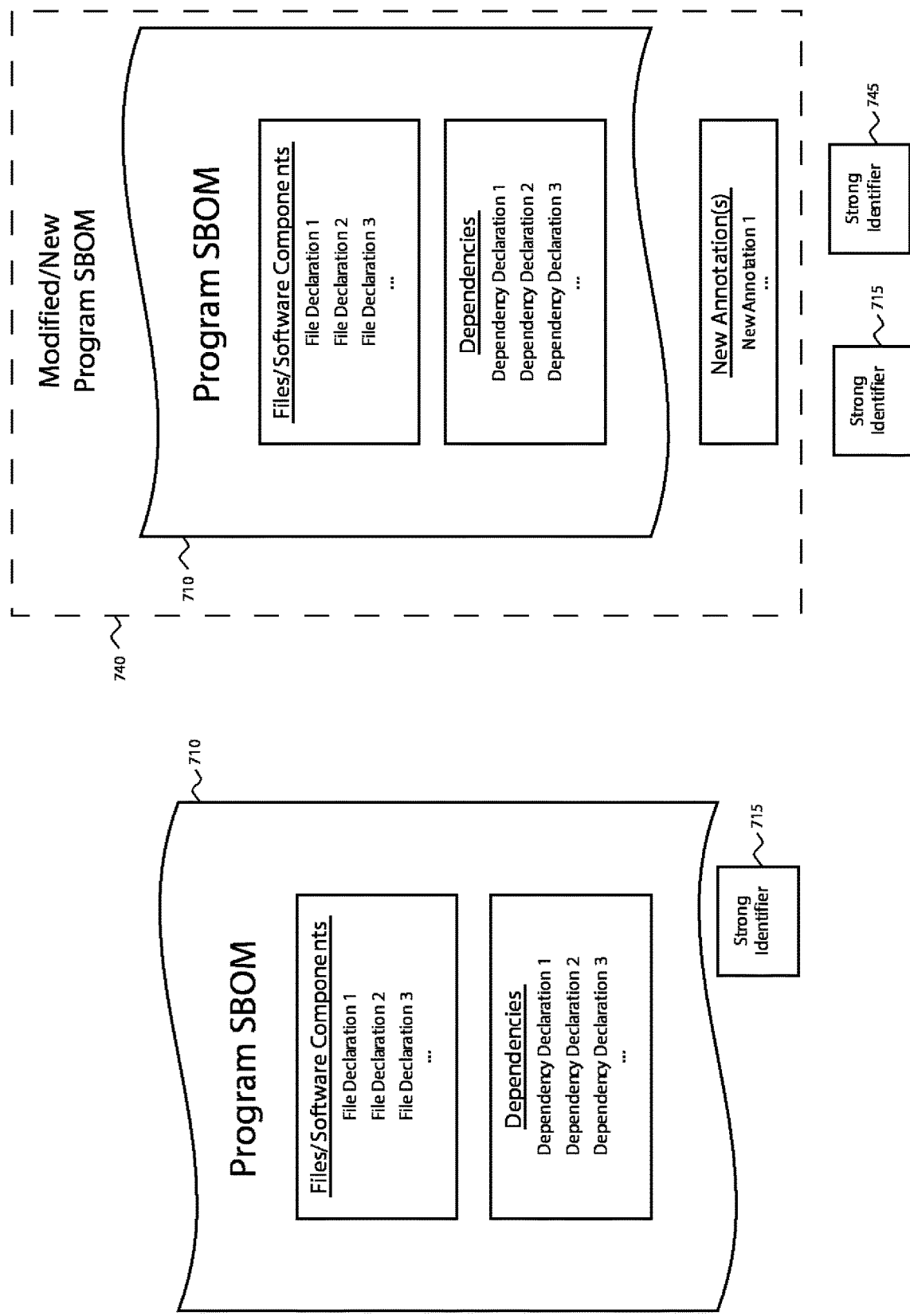

FIGS. 7A-7C include example representations of related embodiments in which an original program SBOM is generated for a program, such as a large programming build, and in which one or more modified/new program SBOMs (720, 730, 740) are generated to omit one or more declarations that are present in the original program SBOM 710 (e.g., File Declaration 3 and/or Dependence Declaration 2).

Such an omission may be made, for example, based on a determination that the file associated with the omitted declaration is not actually used by the program in a particular build or runtime configuration of the program (even if it is declared within an SBOM of an incorporated program chunk).

In FIG. 7A, the modified/new program SBOM 720 has a new strong identifier 725 to verify the contents of the modified/new program SBOM 720, and which is created after modifying the actual contents of the previously existing program SBOM 710 by omitting declarations from the original program SBOM 710. Notably, the modified/new program SBOM 720 has its own strong identifier 715 to verify contents of the SBOM as now modified. The SBOM correlation table(s) can reflect all of the associations between the different SBOMs, their identifiers, as well as their associations to the different build and/or runtime configurations of the corresponding program.

FIG. 7B is similar, but the modified/new program SBOM 730 is generated by adding a new annotation to the contents of the original SBOM 710, wherein the new annotation effectively omit one or more of the declarations of the SBOM 710 by explicitly declaring that the one or more of the declarations in the SBOM are not utilized at all and/or according to certain restricted circumstances (e.g., according to certain runtime configurations, according to certain end-user constraints, according to certain subscription or policy constraints, etc.). Such an embodiment can be useful, for example, by enabling the annotations to be reviewed, during risk assessment processes to determine whether a file identified as being at risk according to a particular declaration in the SBOM is actually not a real risk in view of qualifications mentioned in the new annotation(s), and which effectively omits the particular declaration.

Because the contents of the original SBOM have been modified with the new annotation(s), a new strong identifier 735 will be created for the contents of the modified/new program SBOM 730. The SBOM correlation table(s) will be updated to reflect all of the associations between the different SBOMs, their identifiers, as well as their associations to the different build and/or runtime configurations of the corresponding programs.

FIG. 7C is another example in which a modified/new program SBOM 740 can be generated by incorporating the contents of the original program SBOM 710, as well as one or more new annotations that effectively qualify or omit one or of the declarations in the program SBOM, as noted in FIG. 7B. However, in this example, the annotation is stored outside of the program SBOM 710, while still being linked to the SBOM 710 through association established by the strong identifier 745. This new strong identifier 745 can verify contents of the new annotation(s) only. Or, alternatively, the new strong identifier 745 can be used to verify contents of the program SBOM and the new annotation(s). Either way, the SBOM correlation table(s) can associate the different SBOMs and the different identifiers together, so that the new annotations are linked to the program SBOM, effectively creating a modified/new program SBOM 740.

As previously noted, the strong identifiers can include hashes, digital signatures or other types of strong identifiers that can be used to verify the contents of the SBOMS, annotations or other objects they are associated with have not been modified.

Figure 8:
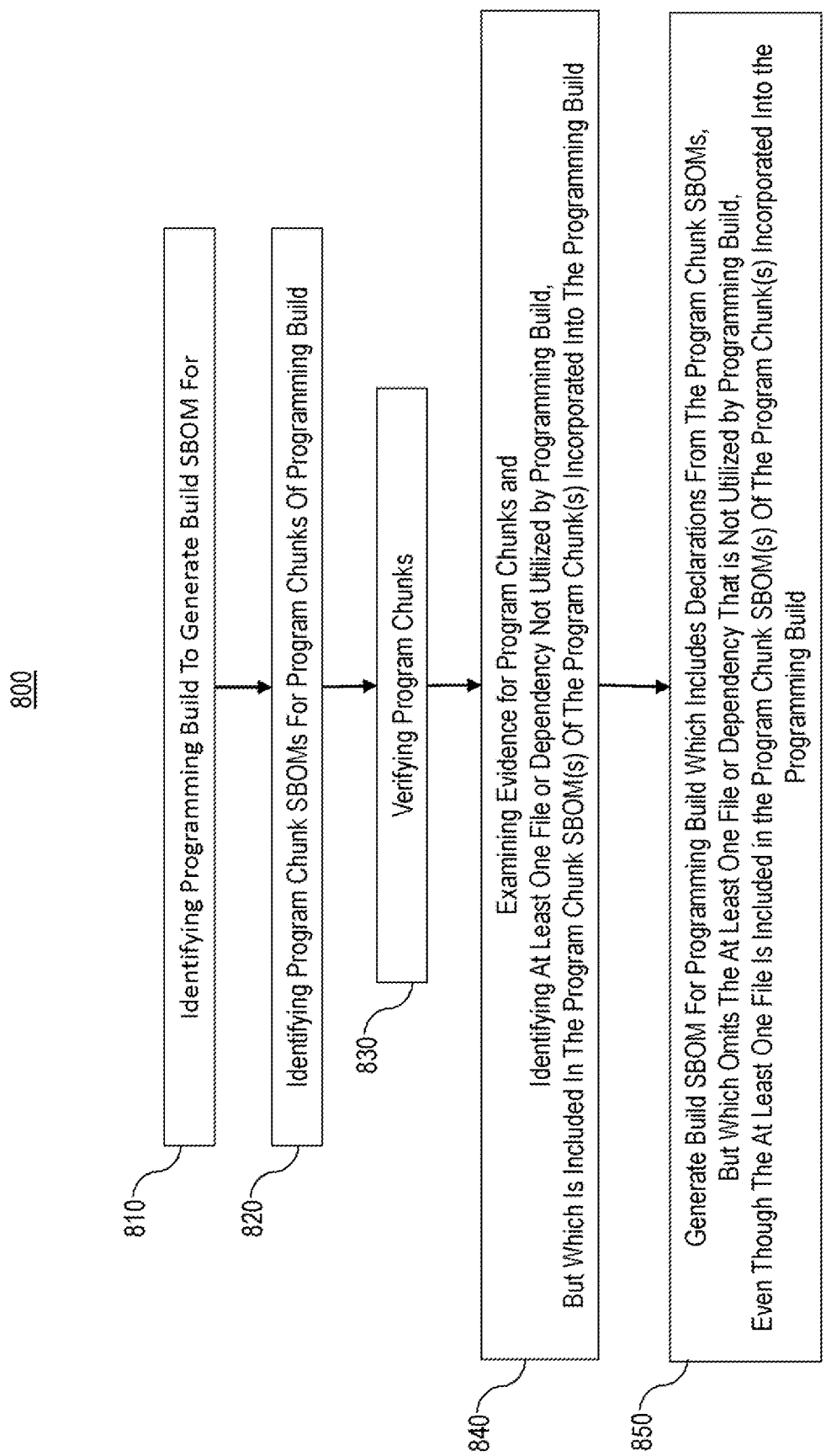
FIG. 8 illustrates an example of a flow diagram with acts associated with methods for building an SBOM.
Figure 9:
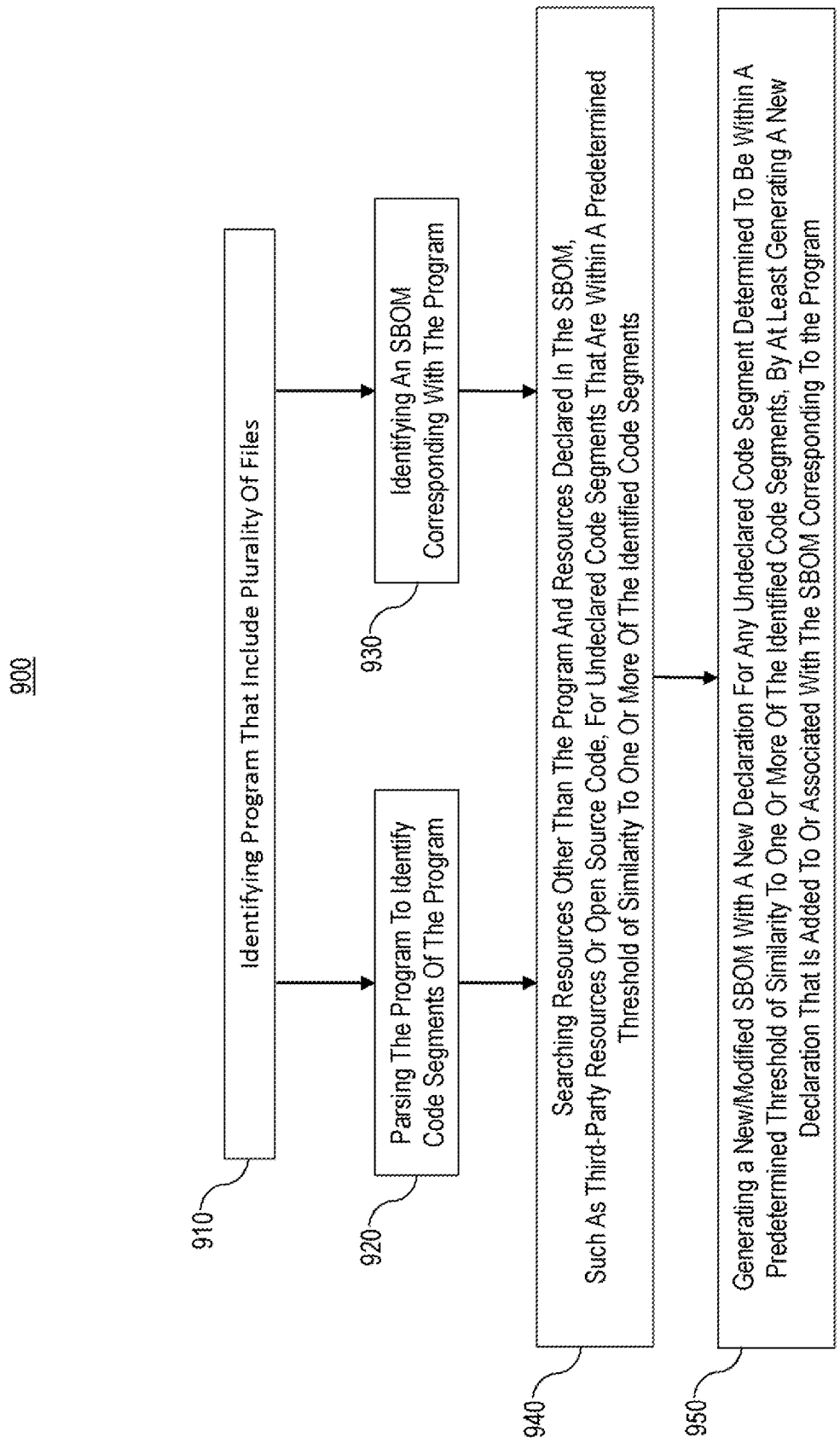
FIG. 9 illustrates an example of a flow diagram with acts associated with methods for modifying an SBOM.

Attention will now be directed to FIGS. 8-10, which illustrate different flow diagrams that include acts associated with the different methods and functionalities described herein. These acts and methods can be performed, for example, by the systems described above, and which are configured to perform the disclosed methods when the system processor(s) execute computer-executable instructions stored by one or more of the system storage devices.

These methods include creating, modifying and using a SBOM, such as, for example, to facilitate risk assessment and threat mitigation for corresponding programs, and particularly for large programming builds.

FIG. 8 illustrates a flow diagram 800 associated with methods for creating an SBOM, such as a build SBOM for a large programming build, wherein the large programming build is composed of a plurality of program chunks that each include a unique set of files and in which the program chunks and files are obtained from a monolithic repository. Each of the program chunks incorporated into the large programming build includes and/or is also associated with a corresponding program chunk SBOM.

As shown, the first illustrated act includes identifying the programming build to generate the build SBOM for, wherein the identified programming build includes a particular configuration utilizing at least one or more files from each program chunk of the set of program chunks. (act 810)

Next, an identification is made of the program chunk SBOM for each corresponding program chunk of the set of program chunks, wherein each program chunk SBOM comprises declarations of files and dependencies associated with files included within each corresponding program chunk (act 820). Although not required, each file of the at least one program chunk may also include a separate file SBOM with one or more file declarations and one or more dependency declarations, wherein the program chunk SBOM incorporates all file declarations and all dependency declarations of all corresponding file SBOMs for all files included in that program chunk.

Then, a verification is made of verifying each program chunk in the set of program chunks, based at least in part on a strong identifier of the corresponding program chunk SBOM associated with said each program chunk (act 830).

Evidence associated with each program chunk of the set of program chunks is also examined to identify at least one program chunk of the set of program chunks that includes at least a particular file or dependency that is not utilized by the programming build, but which is declared in the corresponding program chunk SBOM for that at least one program chunk (act 840).

The evidence, which is stored as electronic records in one or more table(s), database(s) and/or other storage structure(s), identifies/tracks processing applied to or by files included in the different program chunks of a program. Then, based on the tracked processing, a determination can be made when examining the evidence that the particular file does or does not have any executable functionality or applicable dependency within the particular configuration of the program build.

In some instances, to facilitate the tracking of the different types of evidence and their relationships, the evidence is stored in a relational database, (e.g., SQL). In other embodiments, the evidence is stored in a graph database (e.g., NoSQL). One example of a NoSQL database includes Azure Cosmos DB Gremlin API. A graph database may be desired, in some instances, for enabling querying across multiple edges (relationships between nodes) at a same time. This can be particularly beneficial, for example, when checking if one SBOM is an edited version of an earlier SBOM (e.g., original vs. Version 3 of edited SBOM).

In some instances, the examination of evidence includes identifying a declaration of a file referenced in the program chunk SBOM of a program chunk incorporated into the programming build, but which is not utilized by the programming build.

Then, the build SBOM is generated for the programming build by at least including declarations of files and dependencies specified in each of the program chunk SBOMs for the program chunks utilized in the programming build, while refraining from adding a declaration of the particular file or dependency to the build SBOM (act 850). In such instances, the system may further verify that the declaration of the file that was included in the program chunk SBOM is omitted from the SBOM for the large programming build.

In some instances, the build SBOM is also subsequently referenced while performing a risk analysis of the corresponding programming build and/or to make a determination as to whether the corresponding programming build is vulnerable to a new software threat associated with the particular file or related dependency that is not utilized by the programming build and that was intentionally identified and omitted from the build SBOM, even though that omitted declaration is nonetheless included in the chunk SBOM of a chunk that is at least partially incorporated in the programming build.

Some embodiments also include generating the strong identifier of the build SBOM for enabling subsequent verification of the build SBOM and creating a digital record that associates the strong identifier of the build SBOM with an identifier of the particular configuration of the programming build.

In some instances, the act of generating the build SBOM further includes verifying that the build SBOM omits the particular file or dependency from the build SBOM prior to generating the strong identifier of the build SBOM. This may include, for example, adding an explicit declaration to the build SBOM that the particular file or dependency is not utilized by the particular configuration of the programming build that is associated with the build SBOM.

In some instances, a same set of program chunks is used to create both a first build having a first/particular configuration and a different build comprising a second configuration that at least partially incorporates each program chunk of the set of program chunks with a different configuration than the first/particular configuration. In such instances, the method further includes generating a second/modified build SBOM for the second build, the second build SBOM including a declaration for one or more file or dependency that is omitted from a first build SBOM, based on the one or more file or dependency being utilized by the second build but not being utilized by the first build.

By way of example, the second build SBOM may include a file declaration from a reference program chunk SBOM, for example, which is omitted from the first SBOM, the second build SBOM may also include a dependency declaration from the reference program chunk SBOM which is omitted from the first build SBOM.

With regard to the formatting of the build SBOM, it will be appreciated that the SBOM can be written in any appropriate format, such as, but not limited to a SPDX, SWID or CycloneDX format. In some instances, however, the build SBOM will have a different format than an underlying program chunk SBOM, such as may occur when assembling different program chunks into the large build from different sources.

It will also be appreciated that different SBOMs can be created for different permutations of the same set of program chunks that are incorporated into different configurations of the programming build, wherein each different permutation of the set of program chunks includes different combinations of files of the set of program chunks, and wherein each different configuration of the programming build comprises a different program chunk SBOM that is unique from all other program chunk SBOMs associated with the different configurations of the programming build. All of the different build SBOMs can be tracked and correlated with their different configurations in the aforementioned SBOM correlation table(s).

FIG. 9 illustrates a flow diagram 900 associated with methods for managing edits to an SBOM.

The first illustrated act includes identifying a program (act 910). As previously noted, the program may be a large programming build and includes a plurality of files. After identifying the program, the program is parsed to identify a plurality of code segments contained in the plurality of files of the program (act 920).

The disclosed methods also include identifying an SBOM that exists for the program (act 930), which includes file declarations for at least some of the files incorporated into the program, as well as dependency declarations associated with one or more of the files.

In some instances, prior to and/or during parsing of the program, the system may also verify the program and contents of the program based at least in part on a hash analysis or other analysis of the strong identifier associated with the SBOM to identify the different code that is incorporated within and/or utilized by the program.

One or more repositories of open-source code are also searched for any undeclared code segments that are not referenced in the declarations of the SBOM, but which are determined to be within a predetermined threshold of similarity to one or more of the identified plurality of code segments contained in the plurality of files of the program (act 940).

Then, for at least one undeclared code segment determined to be within the predetermined threshold of similarity to the one or more identified plurality of code segments, a new declaration associated with the at least one undeclared code segment is generated for the SBOM to indicate at least author or source information for the undeclared code segments that is determined to be at least partially incorporated into the program (act 950).

Disclosed embodiments also include generating a modified SBOM for the program by adding the new declaration to the SBOM, either explicitly within the recited declarations of the SBOM, or inferentially by linking the new declaration to the SBOM with a strong identifier. In some instances, the new declaration comprises an identification of a reference file that is not directly incorporated into the program, but which preceded the program, and which contains the undeclared code segment. In other instances, the new declaration comprises an identification of the undeclared code segment as a dependency that is relied upon by the one or more of the identified plurality of code segments. The new declaration may also comprise an identification of a dependency that is relied upon by such an undeclared code segment.

Then, in some instances, the modified SBOM is subsequently referenced to perform a risk analysis of the corresponding program and/or to make a determine whether the corresponding program contains a file associated with a particular software threat based at least in part on the new declaration, and which would not be possible without the new declaration.

When adding the new declaration, the system may append the new declaration to an existing SBOM, generate a new strong identifier for the modified SBOM, and create or update/amend a record in the table or index that associates the different identifiers with their SBOMs and corresponding program configurations.

Some embodiments also include generating a notification for one or more entities that have installed or acquired the program prior to the new declaration being added to the SBOM. Such a notification may include a copy of or a link to the modified SBOM.

In such instances, for example, the original SBOM may be generated during an initial build of the program and the modified SBOM may be generated subsequent to the initial build, and prior to or after deployment of the program to one or more end-users. This way, end-users can be aware of the most accurate SBOM that corresponds to the deployed configuration which may be the same as or different than the ultimate installation and runtime configuration and the end-user system.

FIG. 10 illustrates a flow diagram 1000 associated with methods for performing mitigation processes associated with software threats and for resolving the threats and, even more particularly, for tailoring mitigation processes for resolving the threats associated with programs having a corresponding SBOM (software bill of materials).

The first illustrated acts are associated with detecting a threat event which may be associated with one or more of the files of a program. In these embodiments, the program has a corresponding SBOM that includes file declarations for files that are included with the program, as well as dependency declarations associated with one or more of the files.

Accordingly, the processes associated with detecting the threat event include identifying the parameters of the threat event (act 1010), as well as declarations in the SBOM, and determining, based on the parameters of the threat event and the declarations in the SBOM, that the threat event applies to a file or a dependency identified in the declarations of the SBOM (act 1020).

These processes may also include verifying the SBOM based at least in part on an analysis of a strong identifier associated with the SBOM prior to determining whether the threat event applies to any files or dependencies that are identified in the declarations of the SBOM.

The disclosed embodiments also include, in some instances, processes for analyzing a configuration restriction record that specifies that the identified file or dependency is not utilized by the program when the program is run with a particular restriction that restricts at least some functionality of one or more files of the program during runtime (act 1030). By way of example, the particular restriction may be a particular configuration of the program as it is installed and/or a runtime restriction imposed on the program by one or more system policy controls subsequent to installation of the program and which restricts at least some functionality of the program.

In some instances, the processes for analyzing the configuration restriction record include generating and/or modifying the configuration restriction record to associate the particular restriction with the particular configuration of the program as it is installed and/or a runtime restriction imposed on the program by one or more system policy controls subsequent to installation of the program and which restricts at least some functionality of the program.

Then, upon making a determination that the threat event does not apply when the particular restriction identified in the configuration restriction record is applied during runtime of the program at the remote system, based on the parameters of the threat event and the configuration restriction record (act 1040), the threat event is resolved by determining to refrain from taking a remedial action as to that specific installation of the program and refraining from taking any such remedial action based on that determination (act 1050).

The determination to refrain from taking remedial action for a particular threat event (act 1050) is made, in some instances, even though the threat event may include a recommendation to take the remedial action to resolve the threat event. The remedial action that is recommended for resolving the threat event and/or that the system refrains from taking may include, for example, uninstalling or updating at least one file of the program, generating and transmitting notifications to one or more end-users about the threat event, and/or applying the particular restriction identified in the configuration restriction record to the specific installation of the program.

By configuring the systems to refrain from taking unnecessary remedial actions to resolve potential threat events corresponding to file code segments or dependencies associated with declarations in a program SBOM, based on a configuration restriction record identifying the file code segment or file dependency associated with the program, it is possible to conserve the resources that would be consumed during processing associated with unnecessary remedial actions.

In alternative instances, a determination is made that the threat event does apply, even after considering the configuration restriction record, based on the parameters of the threat event and the configuration restriction record (act 1060). In these instances, the threat event is resolved by taking the remedial action (act 1070).

In some embodiments, the system also performs the process of updating the configuration restriction record in response to detected changes to a system hardware or software update at the remote system subsequent to installation of the program at the remote computing system and/or in response to detected changes to permissions of specific users associated with use of the program installed on the remote system.

When changes are made to the program during installation and/or a runtime configuration of the program at the end-user system, for example, some embodiments also include generating a modified SBOM that is specific to that system and the specific installation and/or runtime configuration of the program at that system. Such a modified SBOM will reflect at least one file code segment or file dependency is not utilized by the program in the specific installation, but which is nonetheless included with the program build. In this regard, the modified SBOM can identify the particular restrictions that are imposed and used to determine whether a threat event exists. The modified SBOM can be generated by the program deploying system, by the end-user system and/or a third-party system.

The foregoing methods may be practiced by a computer system including one or more processors and computer-readable media such as computer memory. In particular, the computer memory may store computer-executable instructions that when executed by one or more processors cause various functions to be performed, such as the acts recited in the embodiments.

In this regard, embodiments of the present invention may comprise or utilize a special purpose or general-purpose computer including computer hardware, as discussed. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are hardware storage devices, also referred to herein as physical storage media. Computer-readable media that carry computer-executable instructions are transmission media. Thus, by way of example, and not limitation, embodiments of the invention can comprise at least two distinctly different kinds of computer-readable media: (i) physical computer-readable storage media (e.g., hardware storage devices), and (ii) transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other hardware storage devices which can be used to store desired program code means in the form of computer-executable instructions or data structures and which can be accessed by a general purpose or special purpose computer.

Computer-executable instructions comprise, for example, instructions and data which cause a general-purpose computer, special purpose computer, or special purpose processing device to perform a certain function or group of functions when executed by a hardware processor. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating edits to an SBOM (software bill of materials), the SBOM including file declarations for files that are incorporated into a corresponding program associated with the SBOM, and dependency declarations associated with one or more of the files, the method comprising:
   identifying a program that includes a plurality of files;
   identifying the SBOM, which corresponds to the program and which includes file declarations for at least some of the files that are incorporated into the program, as well as dependency declarations associated with one or more of the files;
   parsing the program to identify a plurality of code segments contained in the plurality of files;
   searching one or more repositories of open-source code that is not referenced in the file declarations of the SBOM for any undeclared code segments determined to be within a predetermined threshold of similarity to one or more of the identified plurality of code segments contained in the plurality of files;
   for at least one undeclared code segment determined to be within the predetermined threshold of similarity to the one or more identified plurality of code segments, generating a new declaration associated with the at least one undeclared code segment to be added to the SBOM to indicate at least author or source information for the at least one undeclared code segment which is at least partially incorporated into the program; and
   generating a modified SBOM by adding the new declaration to the SBOM.

2. The method of claim 1, wherein adding the new declaration to the SBOM includes:
   appending the new declaration to the SBOM;
   generating a new identifier for the modified SBOM; and
   creating or amending a digital record in an index that associates the new strong-identifier with the program.

3. The method of claim 2, wherein the method includes amending an existing record in the index that associates a previous identifier of the SBOM with the program.

4. The method of claim 3, wherein amending the existing record includes adding the new identifier for the modified SBOM to the existing record along with the previous identifier of the SBOM, so that the SBOM and the modified SBOM are both associated with the program by the index.

5. The method of claim 1, wherein the new declaration comprises an identification of a reference file that is not directly incorporated into the program, but which preceded the program, and which contains the undeclared code segment.

6. The method of claim 1, wherein the new declaration comprises an identification of the undeclared code segment as a dependency that is relied upon by the one or more of the identified plurality of code segments.

7. The method of claim 1, wherein the new declaration comprises an identification of a dependency that is relied upon by the undeclared code segment.

8. The method of claim 1, wherein the method further includes, prior to parsing the program, verifying the program based at least in part on an analysis of an identifier.

9. The method of claim 1, the method further comprising generating a notification for one or more entities that have installed or acquired the program prior to the new declaration being added to the SBOM, the notification including the modified SBOM.

10. The method of claim 1, wherein the method further includes generating the SBOM during a build of the program and wherein the generating the modified SBOM occurs prior to deployment of the program to one or more end-users.

11. The method of claim 1, wherein adding the new declaration to the SBOM includes creating a new SBOM with the new declaration, the new SBOM comprising the modified SBOM and including the new declaration along with a reference to an identifier of the SBOM.

12. A computing system comprising:
   one or more hardware processors; and
   one or more storage devices having stored computer-executable instructions that are executable by the one or more hardware processors for configuring the computing system to perform the following:
      identify a program that includes a plurality of files;
      identify an SBOM (software bill of materials), which corresponds to the program and which includes file declarations for at least some of the files that are incorporated into the program, as well as dependency declarations associated with one or more of the files;
      parse the program to identify a plurality of code segments contained in the plurality of files;
      search one or more repositories of open-source code that is not referenced in the file declarations of the SBOM for any undeclared code segments determined to be within a predetermined threshold of similarity to one or more of the identified plurality of code segments contained in the plurality of files;
      for at least one undeclared code segment determined to be within the predetermined threshold of similarity to the one or more identified plurality of code segments, generate a new declaration associated with the at least one undeclared code segment to be added to the SBOM to indicate at least author or source information for the at least one undeclared code segment which is at least partially incorporated into the program; and generate a modified SBOM by adding the new declaration to the SBOM.

13. The computing system of claim 12, wherein adding the new declaration to the SBOM includes:

appending the new declaration to the SBOM;

generating a new identifier for the modified SBOM; and creating or amending a digital record in an index that associates the new identifier with the program.

14. The computing system of claim 13, wherein the computer-executable instructions are further executable for configuring the computing system to amend an existing record in the index that associates a previous identifier of the SBOM with the program.

15. The computing system of claim 12, wherein the new declaration comprises an identification of a dependency that is relied upon by the undeclared code segment.

16. The computing system of claim 12, wherein the new declaration comprises an identification of a reference file that is not directly incorporated into the program, but which preceded the program, and which contains the undeclared code segment.

17. The computing system of claim 12, wherein the computer-executable instructions are further executable for configuring the computing system to generate a notification for one or more entities that have installed or acquired the program prior to the new declaration being added to the SBOM, the notification including the modified SBOM.

18. The computing system of claim 12, wherein the computer-executable instructions are further executable for configuring the computing system to generate the SBOM during a build of the program and wherein the generating the modified SBOM occurs prior to deployment of the program to one or more end-users.

19. The computing system of claim 12, wherein adding the new declaration to the SBOM includes creating a new SBOM with the new declaration, the new SBOM comprising the modified SBOM and including the new declaration along with a reference to an identifier of the SBOM.

20. A computer program product comprising one or more storage devices having stored computer-executable instructions that are executable by one more hardware processors of a computing system for configuring the computing system to:

identify a program that includes a plurality of files;

identify an SBOM (software bill of materials), which corresponds to the program and which includes file declarations for at least some of the files that are incorporated into the program, as well as dependency declarations associated with one or more of the files;

parse the program to identify a plurality of code segments contained in the plurality of files;

search one or more repositories of open-source code that is not referenced in the file declarations of the SBOM for any undeclared code segments determined to be within a predetermined threshold of similarity to one or more of the identified plurality of code segments contained in the plurality of files;

for at least one undeclared code segment determined to be within the predetermined threshold of similarity to the one or more identified plurality of code segments, generate a new declaration associated with the at least one undeclared code segment to be added to the SBOM to indicate at least author or source information for the at least one undeclared code segment which is at least partially incorporated into the program; and generate a modified SBOM by adding the new declaration to the SBOM.

\* \* \* \* \*